United States Patent [19]
Senter et al.

[11] Patent Number: 5,987,593
[45] Date of Patent: *Nov. 16, 1999

[54] SYSTEM AND METHOD FOR HANDLING LOAD AND/OR STORE OPERATIONS IN A SUPERSCALAR MICROPROCESSOR

[75] Inventors: Cheryl D. Senter, Sunnyvale; Johannes Wang, Redwood City; Brett Coon, Milpitas, all of Calif.; Yoshiyuki Miyayama, Suwa, Japan; Le Trong Nguyen, Monte Sereno, Calif.

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/962,705

[22] Filed: Nov. 3, 1997

Related U.S. Application Data

[63] Continuation of application No. 08/789,620, Jan. 27, 1997, abandoned, which is a continuation of application No. 08/307,042, Sep. 16, 1994, Pat. No. 5,659,782, which is a continuation of application No. 07/954,084, Sep. 29, 1992, abandoned.

[51] Int. Cl.$^6$ .............................. G06F 9/44; G06F 9/445; G06F 9/455
[52] U.S. Cl. ........................... 712/206; 712/216; 712/41; 712/238
[58] Field of Search ..................... 395/382, 585, 395/394, 396, 800.23, 859, 500, 384, 800.34, 383, 391, 385, 581, 392, 501, 800.14; 711/141; 364/DIG. 1, DIG. 2, 245; 712/206.41, 216, 238, 34

[56] References Cited

U.S. PATENT DOCUMENTS

| | | | |
|---|---|---|---|
| 3,541,528 | 11/1970 | Randell | 364/245 |
| 4,396,982 | 8/1983 | Wada et al. | 364/200 |
| 4,722,049 | 1/1988 | Lahti | 395/800 |
| 4,734,852 | 3/1988 | Johnson et al. | 395/250 |

(List continued on next page.)

FOREIGN PATENT DOCUMENTS

| | | |
|---|---|---|
| 0147775 | 7/1985 | European Pat. Off. . |
| 0259095 | 3/1988 | European Pat. Off. . |

(List continued on next page.)

OTHER PUBLICATIONS

Johnson, William M., *Super–Scalar Processor Design*, (Dissertation), Copyright 1989, 134 pages.

J.E. Smith et al., "Implementing Precise Interrupts in Pipelined Processors," *IEEE Transactions on Computers*, vol. 37, No. 5, May 1988, pp. 562–573.

Mike Johnson, *Superscalar Microprocessor Design*, Prentice-Hall, Inc., 1991.

*Primary Examiner*—Daniel H. Pan
*Attorney, Agent, or Firm*—Sterne, Kessler, Goldstein & Fox P.L.L.C

[57] ABSTRACT

The present invention provides a system and method for managing load and store operations necessary for reading from and writing to memory or I/O in a superscalar RISC architecture environment. To perform this task, a load/store unit is provided whose main purpose is to make load requests out-of-order whenever possible to get the load data back for use by an instruction execution unit as quickly as possible. A load operation can only be performed out-of-order if there are no address collisions and no write pendings. An address collision occurs when a read is requested at a memory location where an older instruction will be writing. Write pending refers to the case where an older instruction requests a store operation, but the store address has not yet been calculated. The data cache unit returns 8 bytes of unaligned data. The load/store unit aligns this data properly before it is returned to the instruction execution unit. Thus, the three main tasks of the load/store unit are: (1) handling out of order cache requests; (2) detecting address collisions; and (3) alignment of data.

71 Claims, 14 Drawing Sheets

U.S. PATENT DOCUMENTS

| | | | |
|---|---|---|---|
| 4,739,472 | 4/1988 | Hayashi | 395/388 |
| 4,760,519 | 7/1988 | Papworth et al. | 395/393 |
| 4,777,592 | 10/1988 | Yano | 395/393 |
| 4,814,976 | 3/1989 | Hansen et al. | 395/411 |
| 4,942,520 | 7/1990 | Langendorf | 395/407 |
| 5,051,940 | 9/1991 | Vassiliadis et al. | 364/736 |
| 5,075,849 | 12/1991 | Kuriyama et al. | 395/410 |
| 5,133,077 | 7/1992 | Karne et al. | 375/800 |
| 5,148,536 | 9/1992 | Witek et al. | 395/467 |
| 5,155,843 | 10/1992 | Stamm et al. | 395/182.03 |
| 5,185,868 | 2/1993 | Tran | 39/393 |
| 5,251,306 | 10/1993 | Tran | 395/393 |
| 5,317,740 | 5/1994 | Sites | 395/704 |
| 5,323,489 | 6/1994 | Bird | 395/494 |
| 5,371,684 | 12/1994 | Iadonato et al. | 364/491 |
| 5,487,156 | 1/1996 | Popescu et al. | 395/393 |
| 5,561,776 | 10/1996 | Popescu et al. | 395/375 |
| 5,574,927 | 11/1996 | Scantlin | 395/800 |
| 5,592,636 | 1/1997 | Popescu et al. | 395/586 |
| 5,625,837 | 4/1997 | Popescu et al. | 395/800 |
| 5,627,983 | 5/1997 | Popescu et al. | 395/393 |
| 5,708,841 | 1/1998 | Popescu et al. | 355/800 |
| 5,778,210 | 7/1998 | Henstrom et al. | 395/394 |
| 5,797,025 | 8/1998 | Popescu et al. | 395/800 |
| 5,832,205 | 11/1998 | Kelly et al. | 395/185.06 |
| 5,832,293 | 11/1998 | Popescu et al. | 395/800.23 |

FOREIGN PATENT DOCUMENTS

| | | |
|---|---|---|
| 0272198 | 6/1988 | European Pat. Off. . |
| 0302999 | 2/1989 | European Pat. Off. . |
| 0377990 | 7/1990 | European Pat. Off. . |
| 0436092 | 7/1991 | European Pat. Off. . |
| 0 465 321 A2 | 1/1992 | European Pat. Off. . |
| 3603240 | 8/1987 | Germany . |

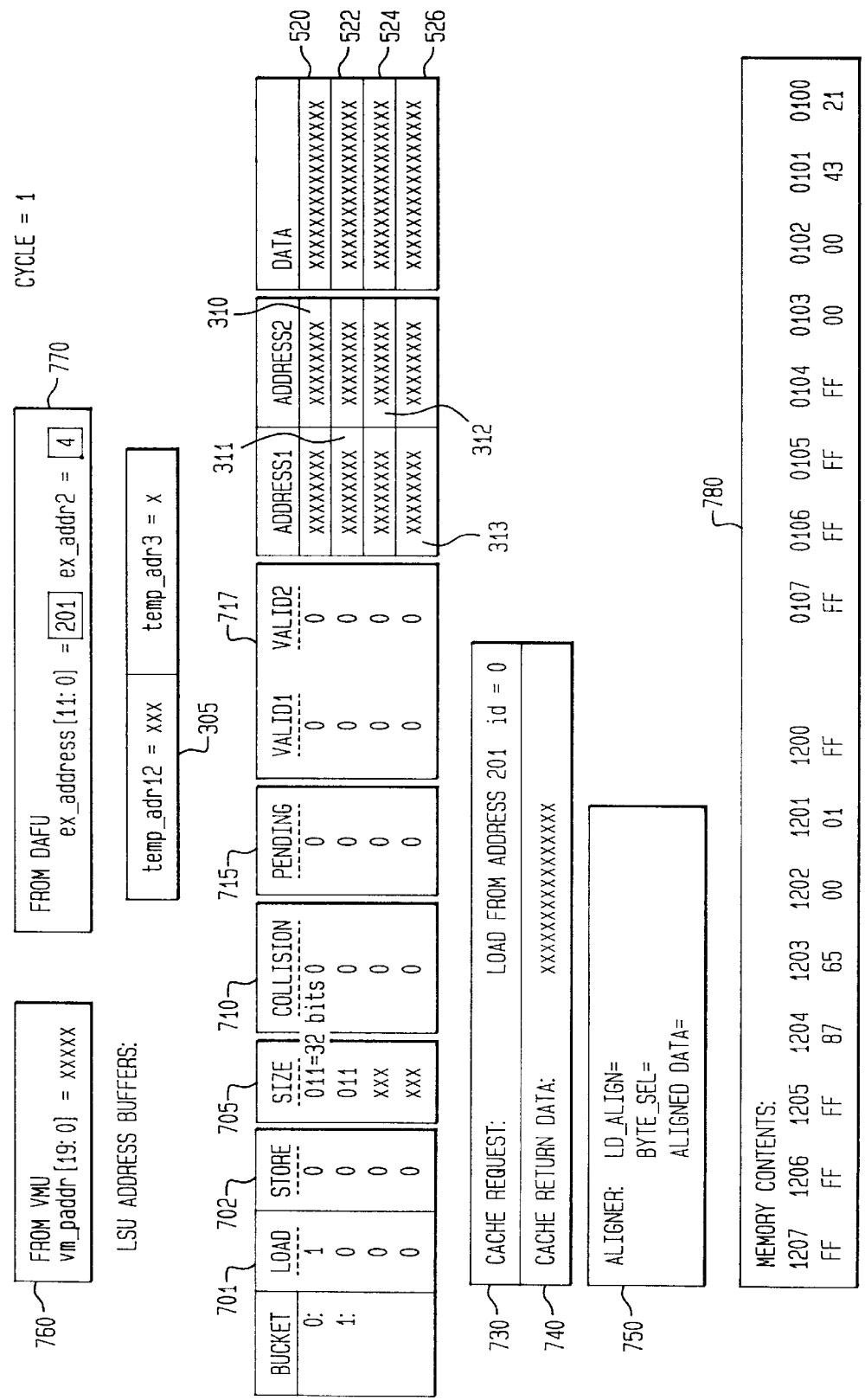

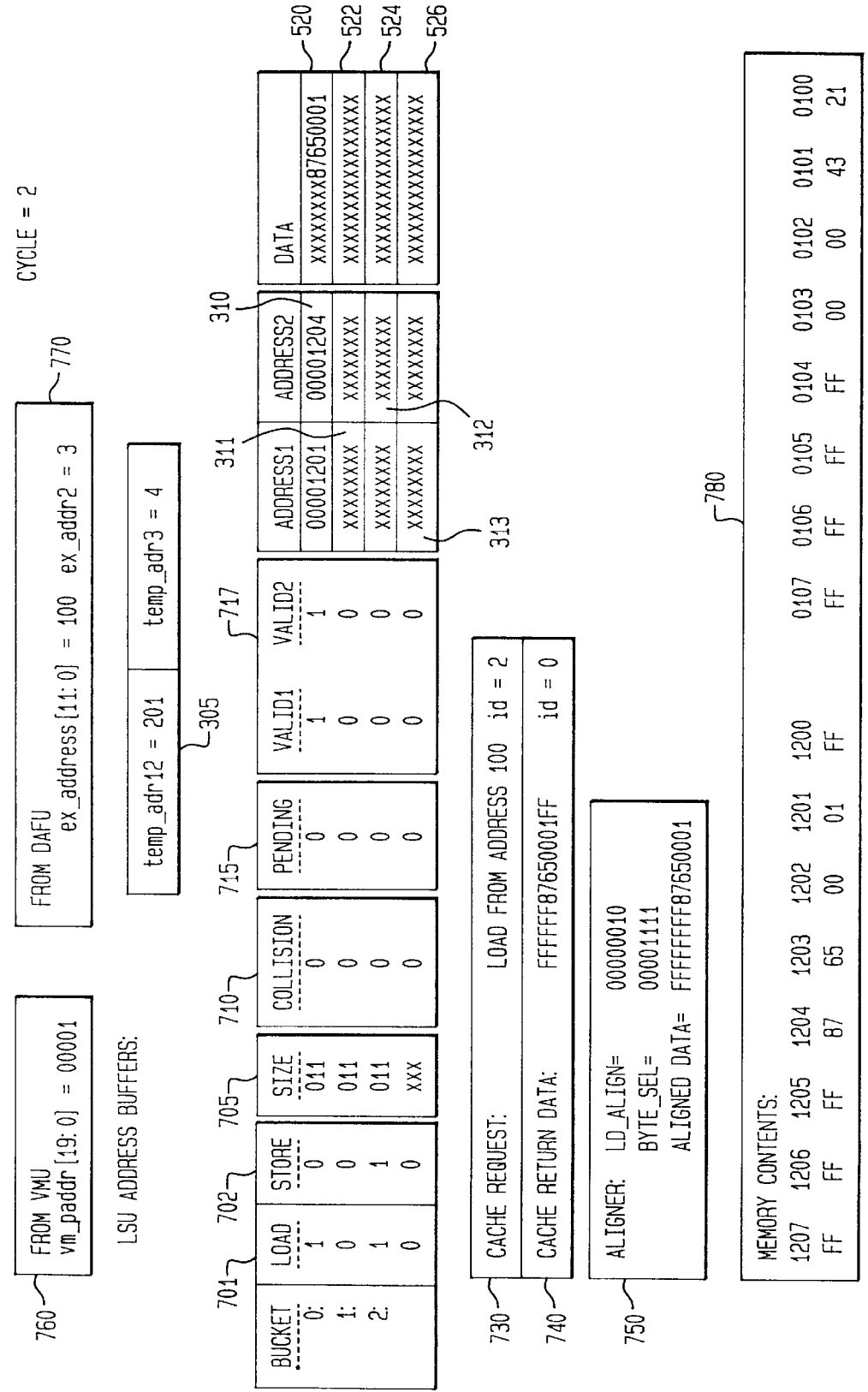

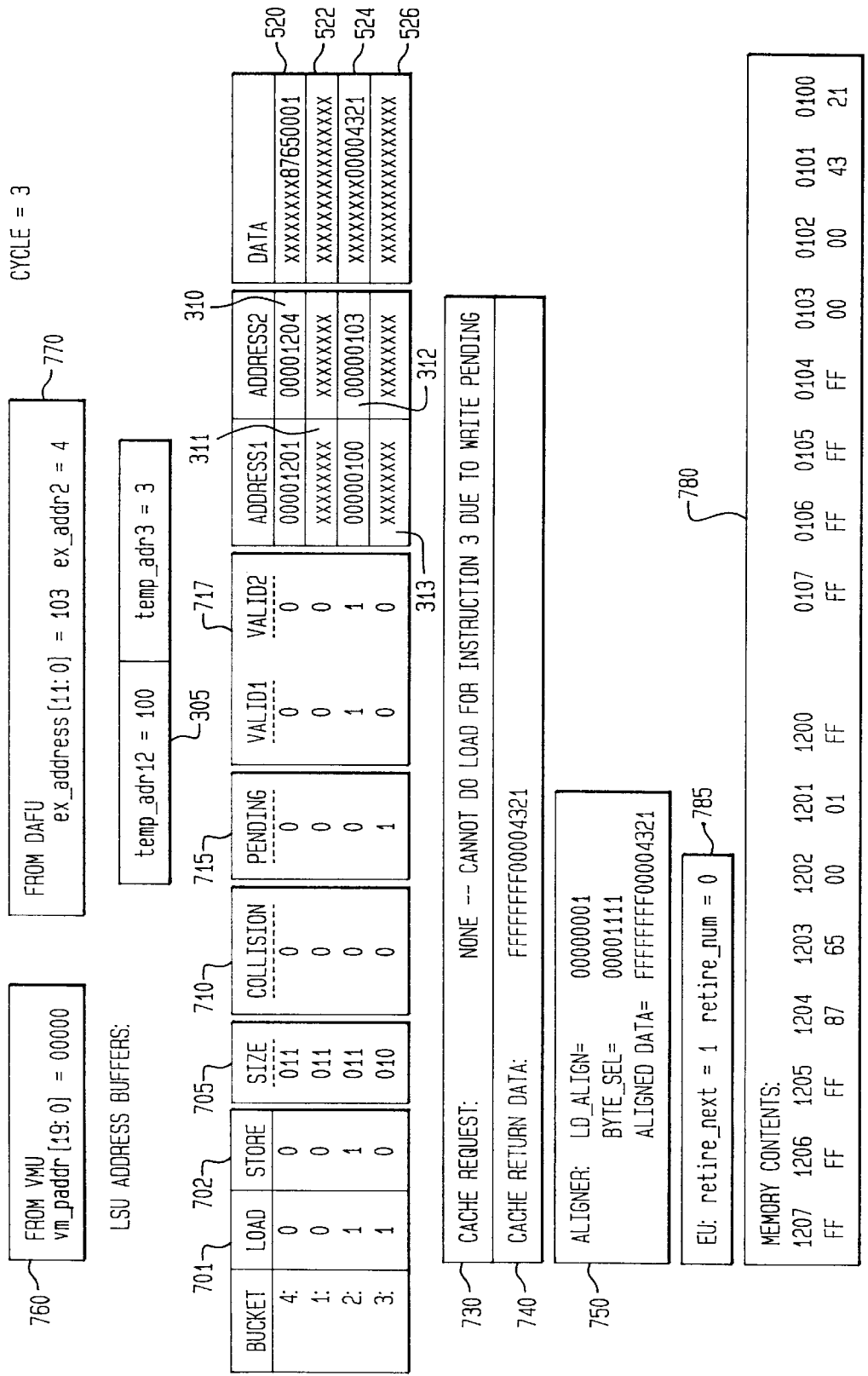

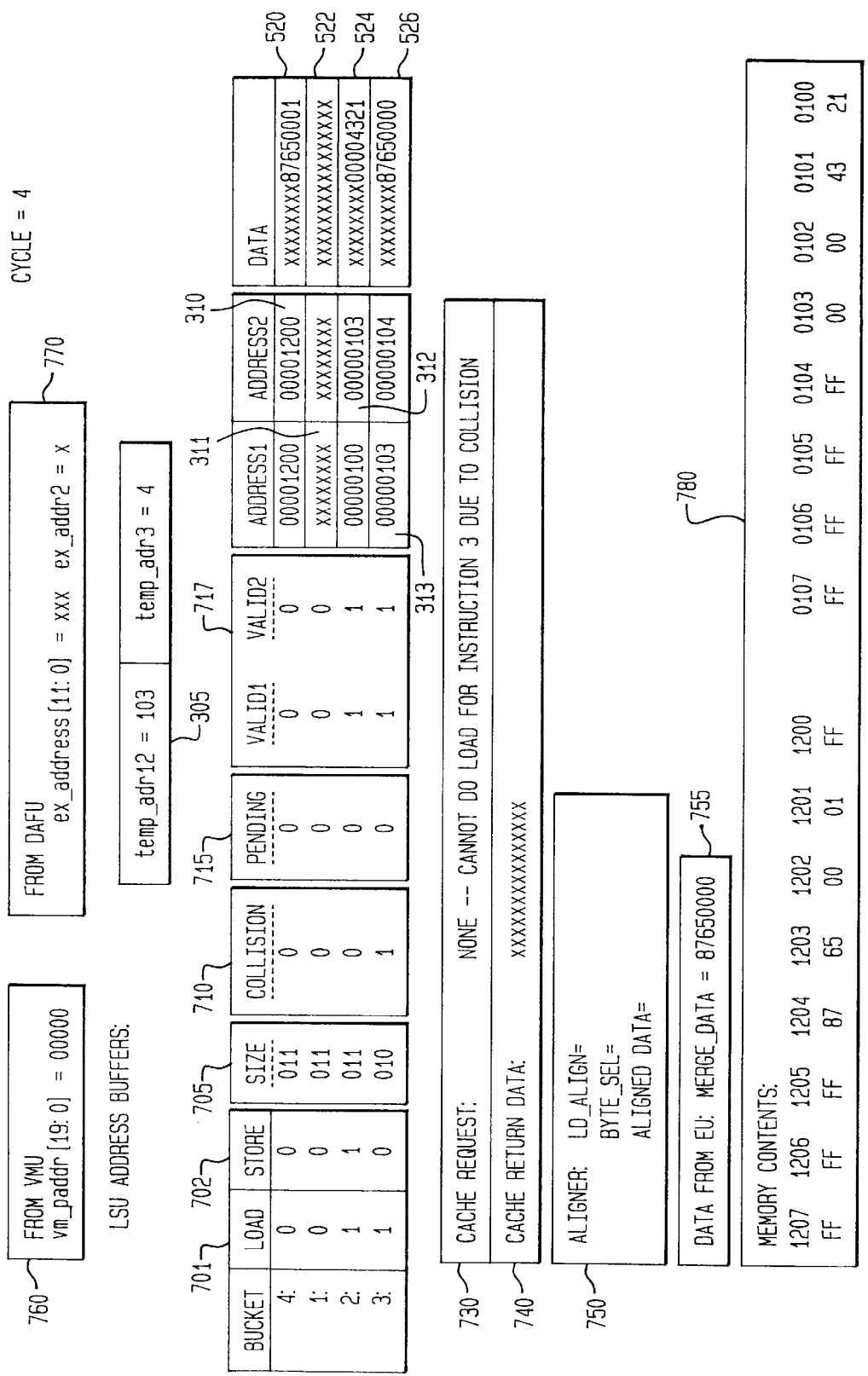

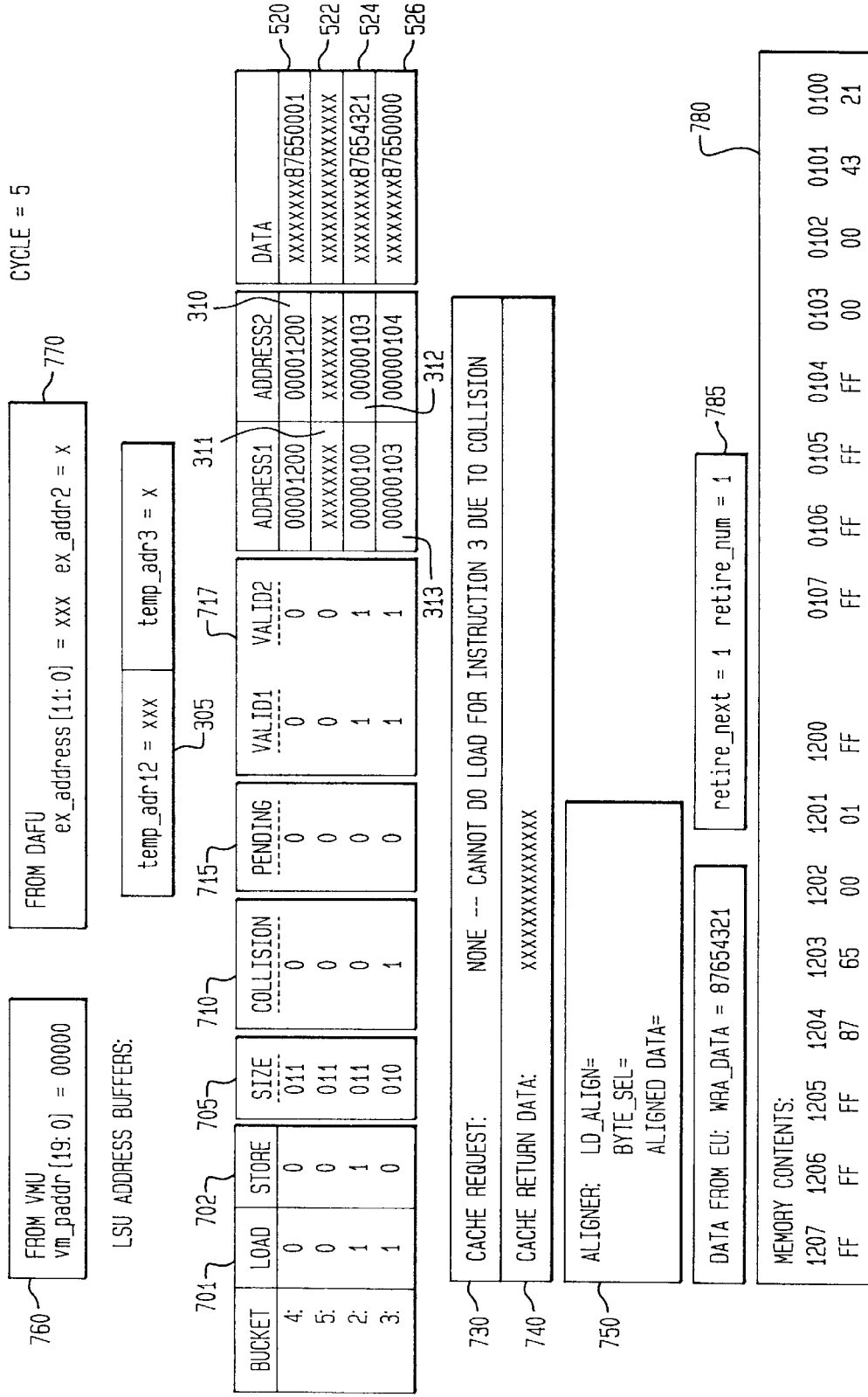

SYSTEM AND METHOD FOR HANDLING LOAD AND/OR STORE OPERATIONS IN A SUPERSCALAR MICROPROCESSOR

This application is a continuation of application Ser. No. 08/789,620, filed Jan. 27, 1997, now abandoned, which is a continuation of application Ser. No. 08/307,042, filed on Sep. 16, 1994, now U.S. Pat. No. 5,659,782, which is a continuation of application Ser. No. 07/954,084, filed on Sep. 29, 1992, now abandoned.

CROSS-REFERENCE TO RELATED APPLICATIONS

The present application is related to the following applications, assigned to the Assignee of the present application: U.S. patent application Ser. No. 07/727,058, filed on Jul. 8, 1991, now abandoned, (attorney docket number SP021) by Nguyen et al. and entitled "EXTENSIBLE RISC MICROPROCESSOR ARCHITECTURE", and to a continuation of the '058 application Ser. No. 07/817,809, filed on Jan. 8, 1992, now abandoned, which are herein incorporated by reference in their entirety.

BACKGROUND OF THE INVENTION

1. Field of the Invention

The present invention relates generally to thee design of a superscalar microprocessor and, more particularly, to a system and method for handling load and store operations in a microprocessor that executes instructions out-of-order.

2. Discussion of Related Art

A major consideration in a superscalar Reduced Instruction Set Computer (RISC) processor is how to execute multiple instructions in parallel and out-of-order, without incurring data errors due to dependencies inherent in such execution. The simplest instruction issue policy for RISC processors, is to issue instructions in exact program order (in-order issue) and to write the results in the same order (in-order completion).

Out-of-order completion is more complex than in-order completion, and improves performance of superscalar processors for the same types of operations. For instance, out-of-order completion is used to improve performance of long-latency operations such as loads or floating point operations. Any number of instructions are allowed to be in execution in the functional units, up to the total number of pipeline stages in all functional units. Instructions may complete out of order, because instruction issuing is not stalled when a functional unit takes more than one cycle to compute a result. Consequently, a functional unit may complete an instruction after subsequent instructions already have completed.

Consider the following code sequence where "op" is an operation, "Rn" represents a numbered register, and ":=" represents assignment:

$$R3:=R3 \; op \; R5 \quad (1)$$

$$R4:=R3+1 \quad (2)$$

$$R3:=R5+1 \quad (3)$$

$$R7:=R3 \; op \; R4 \quad (4)$$

Here, the assignment of the first instruction cannot be completed after the assignment of the third instruction, even though instructions may in general complete out of order. Completing the first and third instructions out of order would leave an odd, incorrect value in register R3, possibly causing, for example, the fourth instruction to receive an incorrect operand value. The result of the third instruction has an "output dependency" on the first instruction and the third instruction must complete after the first instruction to produce the correct output values of this code sequence. Thus, issuing of the third instruction must be stalled if its result might later be overwritten by an older instruction which takes longer to compute.

Out-of-order completion yields higher performance, but requires more hardware, namely data dependency logic. Data dependency logic is more complex with out-of-order completion, because this logic checks data dependencies between decoded instructions and all instructions in all pipeline stages. Hardware must also ensure that the results are written in the correct order. In contrast, with in-order completion the dependency logic checks data dependencies between decoded instructions and the few instructions in execution, and results are naturally written in the correct order. Out-of-order completion also creates a need for functional units to arbitrate for result busses and register-file write ports, because there probably are not enough of these to satisfy all instructions that can complete simultaneously.

Moreover, out-of-order completion makes it more difficult to deal with instruction exceptions. An instruction creates an exception when under a given condition, the instruction cannot be properly executed by hardware alone.

In-order issue processors stop decoding instructions whenever a decoded instruction creates a resource conflict or has a true dependency or an output dependency on an uncompleted instruction. The processor is thus not able to look ahead beyond the instructions with the conflict or dependency, even though one or more subsequent instructions might be executable. A conventional solution is to isolate the decoder from the execution stage, so that it continues to decode instructions regardless of whether they could be executed immediately. This isolation is accomplished by providing a buffer (called an "instruction window") between the decode and instruction stages.

For look-ahead, the processor decodes instructions and places them into the instruction window as long as there is room in the window, and, at the same time, examines instructions in the window to find instructions that may be executed (i.e., instructions that do not have resource conflicts or dependencies). The instruction window provides a pool of instructions, thus giving the processor a look-ahead ability that is limited by the size of the window and the capability of the processor's Instruction Fetch Unit (IFU). This permits issuing of instructions out of order because instructions may be issued from the window with little regard for their original program order. The only constraints on the instruction issuer are those required to ensure that the program behaves correctly.

The issue constraints on any particular instruction are mostly the same as with in-order issue: an instruction is issued when it is free of resource conflicts and dependencies. Out-of-order issue gives the processor a larger set of instructions available for issue, improving its chances of finding instructions to execute concurrently. However, the capability to issue instructions out of order introduces an additional issue constraint, much as the capability to complete instructions out of order introduced the constraint of output dependencies.

To understand this, again consider the above example code sequence. The assignment of the third instruction cannot be completed until the second instruction begins execution. Otherwise, the third instruction might incorrectly overwrite the first operand of the second instruction. The result of the third instruction is said to have an "anti-dependency" on the first input operand of the second instruction. The term anti-dependency refers to the fact that the constraint is similar to that of true dependencies, except reversed. Instead of the first instruction producing a value that the second uses, the second instruction produces a value that destroys a value that the first one uses. To prevent this, the processor must not issue the third instruction until after the second one begins. Because the second instruction depends on the first, the third instruction also must wait for the first to complete, even though the third instruction is otherwise independent.

Anti-dependencies are mainly of concern when instructions can issue out of order. An input operand of a stalled instruction can be destroyed by a subsequent instruction during normal operation. However, in scalar processors, instruction exceptions are sometimes handled by correcting the exceptional condition, then retrying the problematic instruction. If this instruction completed out of order, it is possible that, when it is retried, its input operands have been overwritten by subsequent instructions. This problem cannot occur in a processor that supports precise interrupts. The solution may require that the processor maintain copies of instruction operands to allow restart.

Two typical operations performed by program instructions are load and store operations. Generally, load and store operations read and modify memory locations, respectively. As with other program instructions, loads and stores can be executed out of order. Even though loads and stores can be decoded at the same time, only one load or store is conventionally issued per cycle. A load is typically given priority over a store to use the data-cache, because the load is likely to produce a value that the processor needs to proceed with computation. If a store conflicts with a load for the data-cache, the store is typically held in a store buffer until the store can be performed. Furthermore, a store is conventionally performed in program-sequential order with respect to other stores, and is performed only after all previous instructions, including loads, have completed. This preserves the processor's in-order state in the data-cache, because cache updates are not performed until it is absolutely correct to do so. The store buffer aids in keeping stores in the correct order and in deferring the completion of a store until previous instructions have completed.

Because stores are held until the completion of all previous instructions, and because loads produce values needed for computation in the processor, keeping loads in program order with respect to stores has significant negative impact on performance. If a load waits until all preceding stores complete, and therefore waits until all instruction preceding the most recent store complete, then all instructions following the load that depend on the load data also wait. To avoid this performance problem, a load is allowed to bypass preceding stores that are waiting in the store buffer, and the load data is allowed to be used in subsequent computation.

When a load can bypass previous stores, the load may need to obtain data from a previous store that has not yet been performed. The processor checks for a true dependency that a load may have on a previous store by comparing a virtual memory address of the load against a virtual memory addresses of all previous, uncompleted stores (virtual addresses are addresses computed directly by instructions, before address translation by a memory-management unit has been applied). For this discussion, it is assumed that there is a unique mapping for each virtual address, so that it is not possible for two different virtual addresses to access the same physical location. With this assumption, virtual-address comparisons detect all dependencies between physical memory locations. A load has a true dependency on a store if the load address matches the address of a previous store, or if the address of any previous store is not yet computed (in this case, the dependency cannot be detected, so the dependency is usually assumed to exist). If a load is dependent on a store, the load cannot be satisfied by the data-cache, because the data-cache does not have the correct value. If the valid address of a store matches the address of a subsequent load, the load is satisfied directly from the store buffer—once the store data is valid—rather than waiting for the store to complete.

As the foregoing discussion implies, loads and stores are performed in a manner that avoids anti- and output dependencies on memory locations. Loads can bypass previous stores, but a store cannot bypass previous loads, so there can be no antidependencies between loads and stores. A store is conventionally issued in program order with respect to other stores, so there can be no output dependencies between stores.

Conventionally, loads are performed at the data cache in program order with respect to other loads. Those skilled in the art have thought that there was little or no performance advantage in allowing loads to be performed out of order, because the data supplied to the processor by older loads is more likely to be needed in computation than the data supplied by new loads.

A more detailed description of some of the concepts discussed above is found in a number of references, including John L. Hennessy et al., *"Computer Architecture—A Quantitative Approach"* (Morgan Kaufmann Publishers, Inc., San Mateo, Calif., 1990) and Mike Johnson, *Superscalar Microprocessor Design* (Prentice-Hall, Inc., Englewood Cliffs, N.J., (specifically chapter 8, parts of which have been reproduced above) 1991) which are both incorporated by reference in their entirety.

SUMMARY OF THE INVENTION

The present invention provides a system for managing load and store operations necessary for reading from and writing to memory or I/O in a superscalar RISC architecture environment. The present invention provides a microprocessor system for executing a program stream which includes an instruction fetch unit for fetching instructions from an instruction store and for providing a predetermined plurality of the instructions to an instruction buffer. It further includes an instruction execution unit, coupled to the instruction fetch unit, for executing the plurality of instructions from the instruction buffer in an out-of-order fashion.

The execution unit includes a load/store unit adapted to make load requests to a memory system out-of-order and store requests in-order. Thus, the main purpose of the load/store unit of the present invention is to make load requests out of order whenever feasible to get the load data back to the instruction execution unit as quickly as possible. A load operation can only be performed out-of-order if there are no address collisions and no write pendings. An address collision occurs when a read is requested at a memory location where an older instruction will be writing. Write pending refers to the case where an older instruction requests a store operation, but the store address has not yet been calculated. The data cache unit returns eight bytes of unaligned data. The load/store unit aligns the data properly before it is returned to the instruction execution unit (IEU). Thus, the three main tasks of the load/store unit are: (1) handling out-of-order cache requests; (2) detecting address collision; and (3) alignment of data.

The load/store unit includes an address path adapted to manage a plurality of addresses associated with the plurality of instructions being executed and address collision means for detecting and signaling whether address collisions and write pendings exist between each of the plurality of instructions being executed the load/store unit performs the load requests if no address collisions and no write pendings are detected. The load store unit further comprising a data path for transferring load and/or store data to and from the memory system and the instruction execution unit, the data path configured to align data returned from the memory system to thereby permit data not falling on a cache quadword boundary to be returned from the memory system to the instruction execution unit in correct alignment.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 7(a) through 7(h) illustrate an example of the operation of LSU 205.

DETAILED DESCRIPTION OF THE INVENTION

Figure 1:
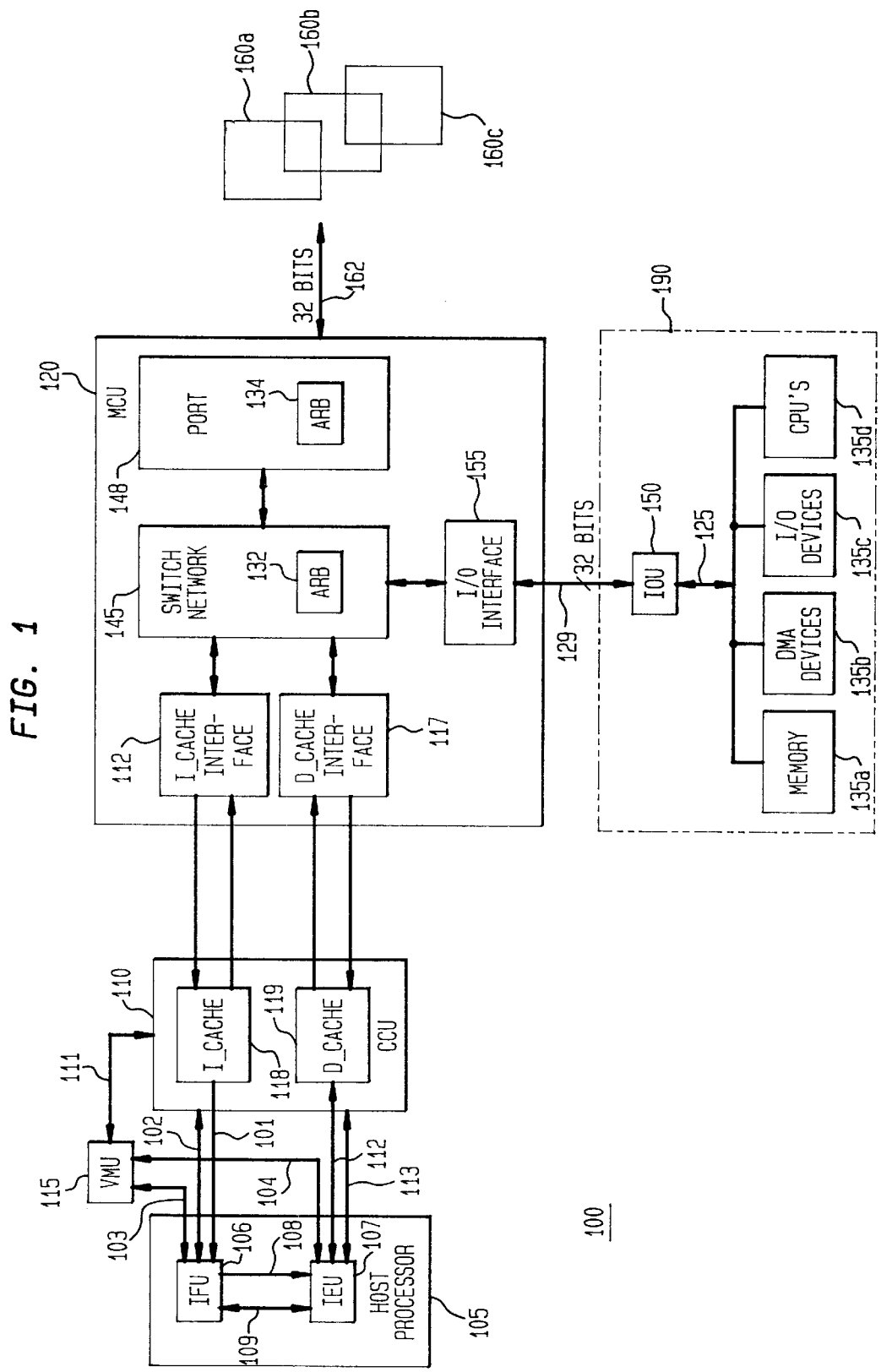
FIG. 1 illustrates a block diagram of a microprocessor architecture 100 in which the present invention operates.

Referring to FIG. 1, there is provided in accordance with a preferred embodiment of the present invention a microprocessor architecture designated generally as 100. System architecture 100 includes a host processor 105, a cache control unit and memory (CCU) 110, a Virtual Memory Unit (VMU) 115, an I/O subsystem 190, a memory control and interface unit (MCU) 120, and interleaved memory banks 160a, 160b, 160c (hereinafter main memory 160) configured for interleaved operations. Main memory 160 is connected to MCU 120 via an external data bus 162. It is contemplated that the present invention will operate in a multiprocessor environment, and as such, other processors will be connected to memory bus 162.

Host processor 105 executes software instructions which are stored at addresses, or locations, in main memory 160. These software instructions are transferred to host processor 105 sequentially under the control of a program counter. Oftentimes, some of the instructions require that host processor 105 access one or more of the peripheral I/O devices 135.

MCU 120 is a circuit whereby data and instructions are transferred (read or written) between CCU 110 (both D-cache 119 and I-cache 118 (read only)), IOU 150, and main memory 160. MCU 120 includes a switch network 145 which has a switch arbitration unit 132, a data cache interface circuit 117, an instruction cache interface circuit 112, an I/O interface circuit 155, and one or more memory port interface circuits 148 known as ports, each port interface circuit 148 includes a port arbitration unit 134.

Switch network 145 is a means of communicating between a master and slave device. The possible master devices to switch network 120 are D__Cache 119, I__Cache 118, or an I/O Controller Unit (IOU) 150 and the possible slave devices are memory port 148 or IOU 150, for example. The function of switch network 145 is to receive the various instruction and data requests from CCU 110 (i.e., I__Cache 118 and D__Cache 119) and IOU 150. These units may be referred to as bus requestors. After having received these requests, the switch arbitration unit 132 and the port arbitration unit 134 prioritizes the request(s) and passes them to the appropriate memory port (depending on the instruction address). The port 148, or ports as the case may be, will then generate the necessary timing signals, and send or receive the necessary data to and from external memory bus 162.

An Instruction Fetch Unit (IFU) 106 and an Instruction Execution Unit (IEU) 107 are the principle operative elements of host processor 105. VMU 115, CCU 110, and MCU 120 are provided to directly support the function of IFU 106 and IEU 107. IFU 106 is primarily responsible for the fetching of instructions, the buffering of instructions pending execution by IEU 107, and, generally, the calculation of the next virtual address to be used for the fetching of next instructions. Simultaneously, instructions are fetched by IFU 106 from I__cache 118 via instruction bus 101. The instructions are placed in "buckets" or sets of four instructions. The transfer of instruction sets is coordinated between IFU 106 and CCU 110 by control signals provided via a control bus 102. The virtual address of an instruction set to be fetched is provided by IFU 106 via an IFU control and address bus 103 to VMU 115. Arbitration for access to VMU 115 arises from the fact that both IFU 106 and IEU 107 utilize VMU 115 as a common, shared resource. In the preferred embodiment of architecture 100, the low order bits defining an address within a physical page of the virtual address are transferred directly by IFU 106 to the CCU 110 via control lines 102. The virtualizing high order bits of the virtual address supplied by IFU 106 are provided by the address portion of the buses 103, 104 to VMU 115 for translation into a corresponding physical page address. For IFU 106, this physical page address is transferred directly from VMU 115 to the CCU 110 via the address control lines 111 one-half internal processor cycle after the translation request is placed with VMU 115.

The instruction stream fetched by IFU 106 is, in turn, provided via an instruction stream bus 108 to IEU 107. Control signals are exchanged between IFU 106 and IEU 107 via control lines 109.

IEU 107 stores and retrieves data from D__Cache 215 via a bi-directional data bus 112. The entire physical address for IEU 107 data accesses is provided via an address portion of control bus 113 to CCU 110. IEU 107 utilizes VMU 115 as a resource for converting virtual data addresses into physical data addresses suitable for submission to CCU 115. Unlike operation with respect to IFU 106, VMU 115 returns the corresponding physical address via bus 104 to IEU 107.

CCU 110 is used to serve as a buffer between host processor 105 and main memory 160. Generally, CCU 110 is a small, fast memory located close to host processor 105 that holds the most recently accessed code or data. CCU 110 performs the generally conventional high-level function of determining whether physical address defined requests for data can be satisfied from the instruction and data caches 118, 119 as appropriate. Where the access request can be properly fulfilled by access to the instruction or data caches 118, 119, CCU 110 coordinates and performs the data transfer via the data buses 101, 113. Where a data access request cannot be satisfied from the instruction or data cache 118, 119, CCU 110 provides the corresponding physical address to MCU 120 along with sufficient control information to identify whether a read or write access of main memory 160 is desired, the source or destination cache 118, 119 for each request, and additional identifying information to allow the request operation to be correlated with the ultimate data request as issued by IFU 106 or IEU 107.

Figure 2:
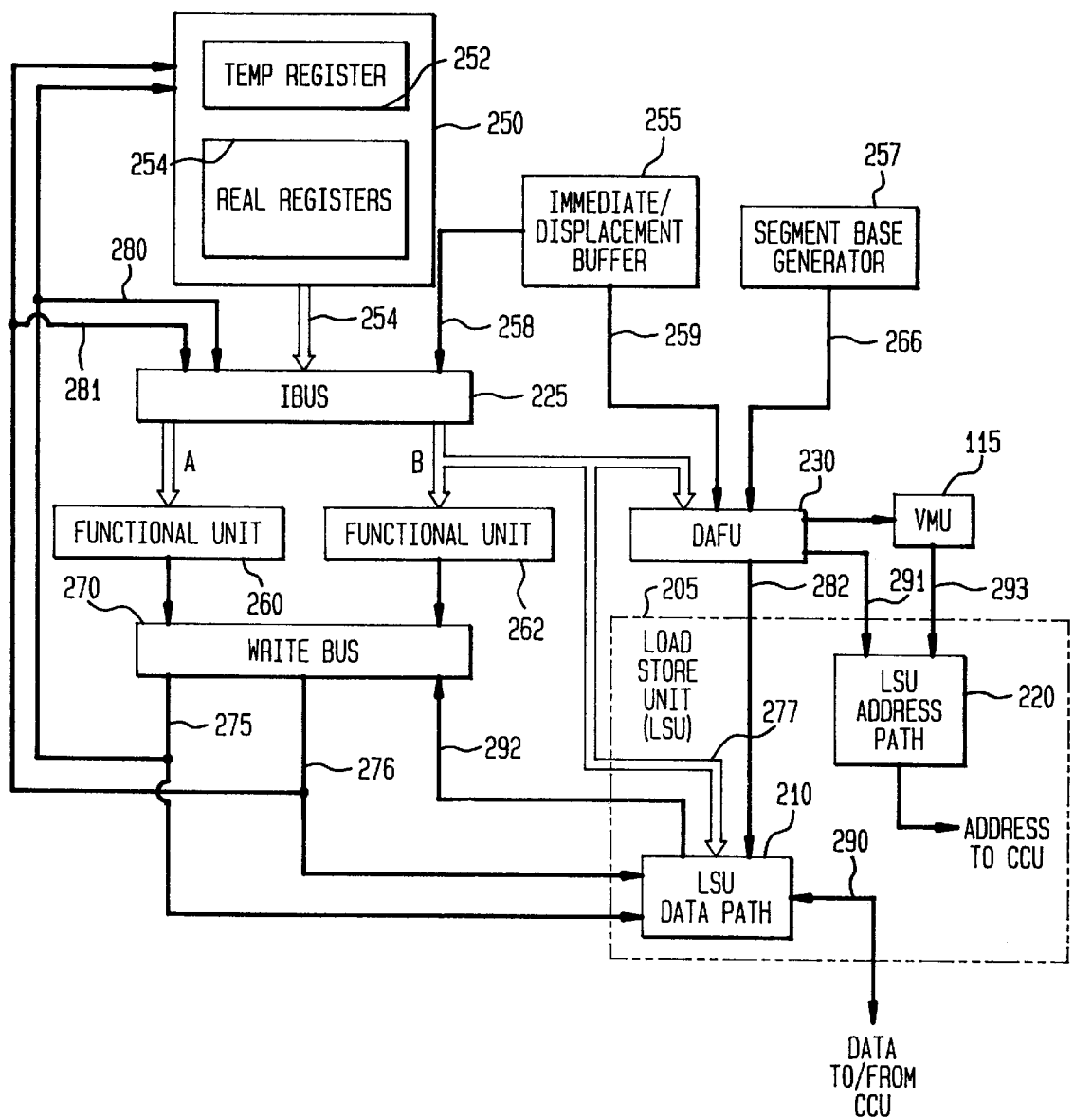
FIG. 2 illustrates a general block diagram of Instruction Execution Unit (IEU) 107, which includes load store unit (LSU) 205.

FIG. 2 shows a representative high level block diagram of IEU 107 datapath. Simply put, the goal of IEU 107 is to execute as many instructions as possible in the shortest amount of time. IEU 107 contains a register file 250, a load store unit (LSU) 205, an instruction bus (IBUS) 225, a set of functional units 260, 262, 230, an immediate displacement buffer 255, a segment base generator 257, and a writebus 270. LSU 205 is divided into two parts: a LSU address path 220 and a LSU data path 210.

A superscalar control block (not shown) determines when an instruction can be issued by performing a data dependency check and checking to determine whether the required functional unit 260, 262, 230 is available. Once the superscalar control block decides to issue an instruction, IBUS 225 retrieves (from register file 250, bypass data 280, 282, or immediate data 258, 259) the data required by the issued instruction. IBUS 225 is comprised of a plurality of multiplexers that select which data will be transferred to functional units 260, 262 and 230. IBUS 225 transfers the data to a pair of buses: an A bus and a B bus. The selected data is placed on either the A bus or the B bus by determining which functional unit 260, 262, 230 will be used by the instruction or is required by the operation of the instruction being executed.

Most instructions' inputs and outputs come from, or are stored in, one of several register files. In a preferred embodiment, each register file 250 (e.g., separate integer, floating point and boolean register files) has thirty-two real entries 254 plus a group of eight temporary buffers 252. When an instruction completes (the term "complete" means that the operation is complete and the operand is ready to be written to its destination register) its results are stored in a preassigned location in temporary buffers 252. The results are later moved to the appropriate places in real registers 254. This movement of results from temporary buffers 252 to real registers 254 is called "retirement." More than one instruction may be retired at a time. Retirement comprises updating the "official state" of the machine including the computer's program counter.

Instructions are sent to IEU 107 from IFU 106 through an instruction decode FIFO (first-in-first-out) register stack storage device (not shown) (referred to herein as an instruction window) in groups of four called "buckets." The bucket is broken up into four units: a load, a store, and two execute units. The bucket has been broken up into these four units since system 100 operates with instructions that can perform either a load, a store, an execute, or a combination of all three. Thus, the present invention provides a bucket that can handle all three situations.

IEU 107 can decode and schedule up to four buckets of instructions at one time. The instruction window stores 16 total instructions in four buckets. IEU 107 examines the instruction window; every cycle IEU 107 tries to issue a maximum number of instructions from the instruction window. Once all the instructions in a bucket are executed and their results are stored in the processor's register file 250, the bucket is flushed from the instruction window and a new bucket is stored in the instruction window.

Once the instruction is issued, the registers in register file 250 can be accessed. The temporary register 252 is accessed when an instruction, that had a data dependency on data produced from an earlier instruction, is executed. The data from register file 250 is transferred via data lines 254 to IBUS 225.

DAFU 230 calculates a 32-bit linear address for use by LSU 205. DAFU 230 supports many different addressing modes. DAFU 230 calculates the first and last address of the data which takes two cycles if the data crosses a quad-word boundary. Up to four components are added to form the address. These components are the segment base, a base register, a scaled index register, and a displacement value. The Segment Base contains the starting address of the desired memory segment. The base and index registers are any 32-bit register from the register file 250. The index register is scaled by multiplying it by 1, 2, 4 or 8. The displacement value is a constant value (immediate) given in the instruction. Any of these fields can be omitted giving maximum flexibility in address calculation.

The segment base comes from the Segment Register block 257. Segment base generator 257 produces a value that is indicative of how the data is partitioned in memory, and transfers this value to DAFU 230 via date line 266. The displacement comes from an immediate displacement buffer 255. Immediate displacement buffer 255 transfers immediate data via lines 265 to DAFU 230 and to IBUS 225 via data lines 258 and 259, respectively. DAFU 230 and VMU 115 provide LSU 205 with the addresses of any load and/or store requests. LSU 205 processes these requests and eventually returns any requested data to write bus 270. The write bus 270 is comprised of a set of multiplexers that select which data (e.g., data provided by LSU 205 or data provided by functional units 260 or 262) to latch into register file 250 based on a priority scheme. The data is transferred from write bus 270 to register file 250 via lines 275, 276. Data from load and/or stores are always given highest priority. Occasionally, when two instructions are issued back to back, and they depend on each other, IEU 107 would like to bypass storing the data into the register file 250 and latch it immediately into IBUS 225. This can be accomplished via data lines 280, 281. Consequently, the resources that are waiting for the data need not waste a cycle waiting for the data to flow through the register file 250.

Data from data lines 275, 276 is also provided directly to LSU data path 210 in case an instruction involves an execute operation and a store operation. After performing the load and execute operations, the data can be directly transferred to LSU datapath 210 in order to perform the store. This eliminates having to access the temporary register file 252 for the store data, which in turn increases instruction execution time.

The main purpose of LSU 205 is to make load requests to CCU 110 out of order whenever feasible to get the load data back to IEU 107 as quickly as possible. A load operation can only be performed out of order if there are no address collisions and no write pendings. An address collision occurs when a read is requested at a memory location where an older instruction will be writing. Write pending refers to the case where an older instruction requests a store operation, but the store address has not yet been calculated. LSU 205 is divided into two parts: data path 210 and address path 220. The address path 220 interfaces with DAFU 230, VMU 232, and CCU 110 and the datapath interfaces with the writebus 270, CCU 110, DAFU 230, and IBUS 225. The three main tasks of LSU are: (1) out of order cache requests; (2) address collision detection; and (3) data alignment.

Each bucket of instructions can contain a load and a store to the same address (with some other operation in between), a load only, a store only, or no load and no store. Thus, LSU 205 has a selection of up to four loads and four stores to choose from. The instruction set used in the preferred embodiment of the present invention is a CISC instruction set which allows such complex operations as:

a) R1≦R1+[R2+(R3*2)+3]
b) [R2]≦[R2] OR R4 where [x] indicates a memory operand located at address x. The instruction decode unit (not shown) in a preferred embodiment breaks down these CISC instructions into RISC sequences as follows:

a) LOAD [R2+(R3*2)+3]≧Temp Register Execute R1+Temp≧R1
b) LOAD [R2]≧Temp Register Execute Temp OR R4≧Temp Register STORE Temp Register to address [R2]

In both cases, DAFU 230 calculates the address of the memory operand, but only one address calculation is necessary per instruction bucket because the load and the store share the same address. For a description of decoding CISC instructions into RISC instructions see U.S. patent application Ser. No. 07/857,599 (attorney docket number SP032) entitled "CISC to RISC Instruction Translation Alignment and Decoding" filed Mar. 31, 1992, which is hereby incorporated by reference.

Figure 3:
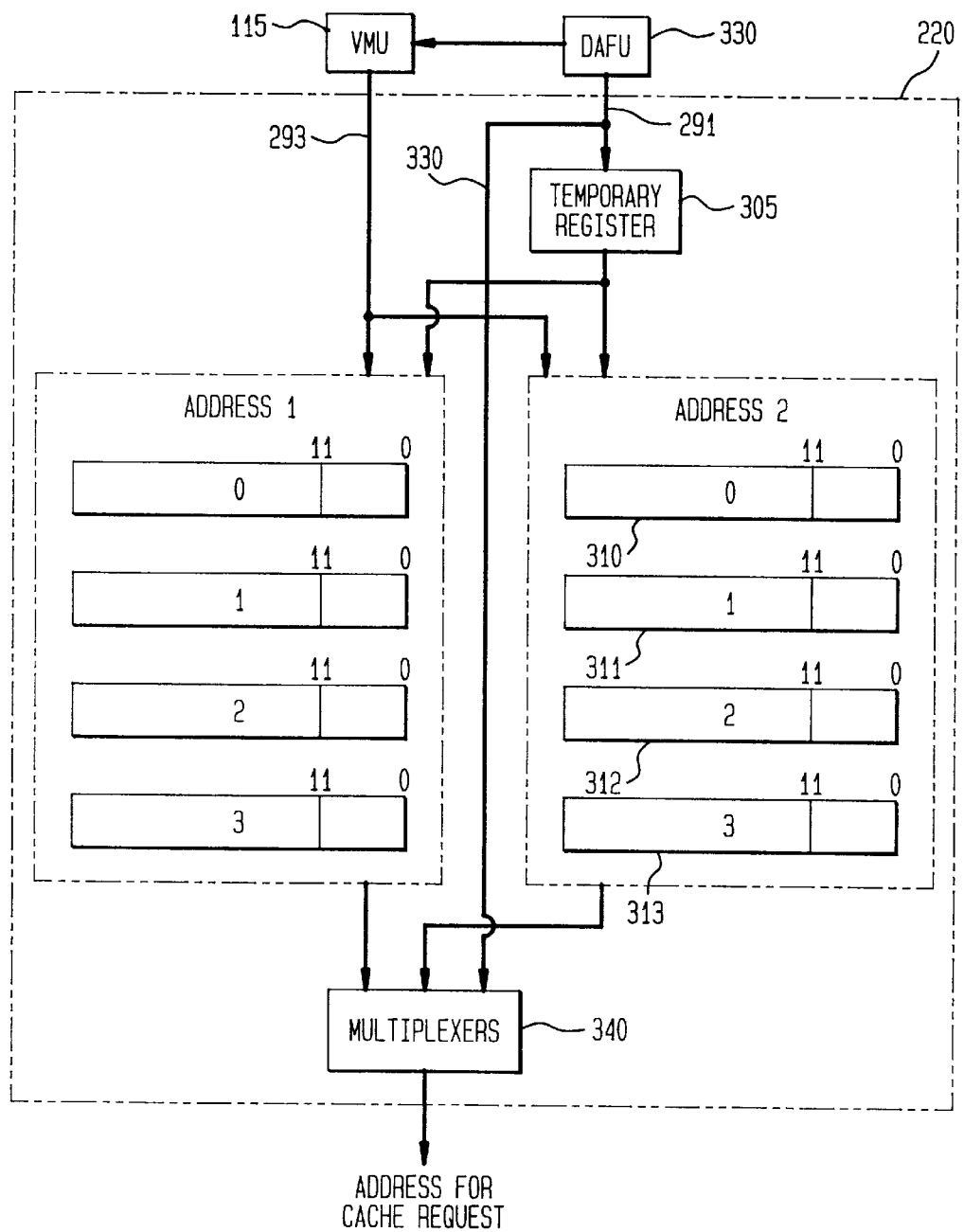
FIG. 3 illustrates a block diagram of LSU address path 220.

FIG. 3 shows a detailed block diagram of the address path 220 of LSU 205. Load instructions are issued from the instruction window for execution out of order by IEU 107, whereas stores are always issued in order. The address for the load and/or store is calculated as soon as all operands are valid and DAFU 230 is available for address calculation. LSU 205 can make a cache request before it has the physical address from DAFU 230. However, if the physical address is not provided from DAFU 230 and VMU 115 by the next clock cycle, the cache request is cancelled. If the cache request is cancelled, it must be re-issued at a later time.

Only one address is needed for each instruction bucket and serves as both a load address and a store address. For each instruction bucket, two 32-bit addresses are stored in one of the address buffers 310–313: one for the first byte of the access and one for the last byte of the access. When the lower 12-bits are ready from DAFU 130, they are latched into a temporary buffer 305. The following cycle, when the upper 20 bits are ready from the VMU 115, all 32-bits are latched into the appropriate address buffer (i.e., Address1 or Address2). Address calculation is not done in instruction order, but instead is performed when the register dependencies have cleared. After translation of the address, a valid bit (not shown) is set in the instruction's address buffer 310–313 indicating that the address is valid. There are two reasons for keeping both addresses: address collision detection and cache request for page crossing.

The address utilized by LSU 205 is a physical address as opposed to the virtual address utilized by IFU 106. While IFU 106 operates on virtual addresses, relying on coordination between CCU 110 and VMU 115 to produce a physical address, IEU 107 requires LSU 205 to operate directly in a physical address mode. This requirement is necessary to insure data integrity in the presence of out-of-order executed instructions that may involve overlapping physical address data load and store operations. In order to insure data integrity, LSU 205 buffers data provided by store instructions until the store instruction is retired by the IEU 107. Consequently, store data buffered by LSU 205 may be uniquely present only in LSU 205. Load instructions referencing the same physical address as an executed but not retired store instruction(s) are delayed until the store instruction(s) is actually retired. At that point the store data may be transferred to the CCU 110 by LSU 205 and then immediately loaded back by the execution of a CCU data load operation.

As discussed above, address calculation by DAFU 230 occurs in one clock cycle and address translation by VMU 132 the next. If the address is for a load, then a cache request is made. If the address is for a store, then LSU 205 waits for the retirement signal to be sent before performing the store. A load request can be made to CCU 110 as early as the first cycle of the address calculation. The lower 12-bits of the address are sent to CCU 110 at this time and the upper 20-bits (which represent the page number) are sent to CCU 110 the following cycle after address translation.

When the load store address path 220 is free, an immediate request can be made to cache 110 via line 330. Since there are no pending load and/or store addresses currently in the load store address path 220, there is absolutely no danger of an address collision or a write pending. Thus, the request can be made immediately to cache 110.

Block 340, which includes a plurality of multiplexers, is used for selecting the address for the cache request from address buffers 310–313.

LSU 205 uses address buffers (i.e., reservation stations) 310–313 for making requests to cache 110. The four address buffers 310–313 (also referred to as reservation stations) correspond to the four buckets contained in the central instruction window (not shown). When IEU 107 requests the new bucket from the decode unit (not shown), one of the address buffers 310–313 is reserved. The address buffer 310–313 is assigned according to instruction number. An historical pointer is updated to indicate the youngest (or newest) instruction. At this time, it is known whether the instruction involves a load, a store, both, or neither, as is the size of the data involved in the load and/or store operation. Address buffers 310–313 are deallocated when the corresponding instruction is retired by IEU 107. Subsequent to deallocation, a new instruction bucket is received from the decode unit (not shown).

A load dependency (address collision) on a store must be detected in order to use load bypassing and out-of-order load execution. A load dependency is indicated by an address collision or a pending store address. A load dependency occurs when a load operation is requested at a memory location where an older instruction requested a store operation. The address collision detection requires the first address of the load to be compared against two addresses (the first and last) for each older store. This extra comparison with the last byte of the address is required since the store could cross a quad-word page boundary or be unaligned. Masking of the address bits is done depending on the size of the data to minimize false dependency detection. If the load data crosses a quad-word (64-bit) boundary, it is assumed in a preferred embodiment to have a load dependency since comparators are not available to check the second address of the load against the two addresses of each store. When a collision is detected, the load operation must wait until after the colliding store operation has been sent to CCU 110. A pending store address means that the address of the store is not yet valid, so a load dependency must be assumed until the time the address is known.

Figure 4:
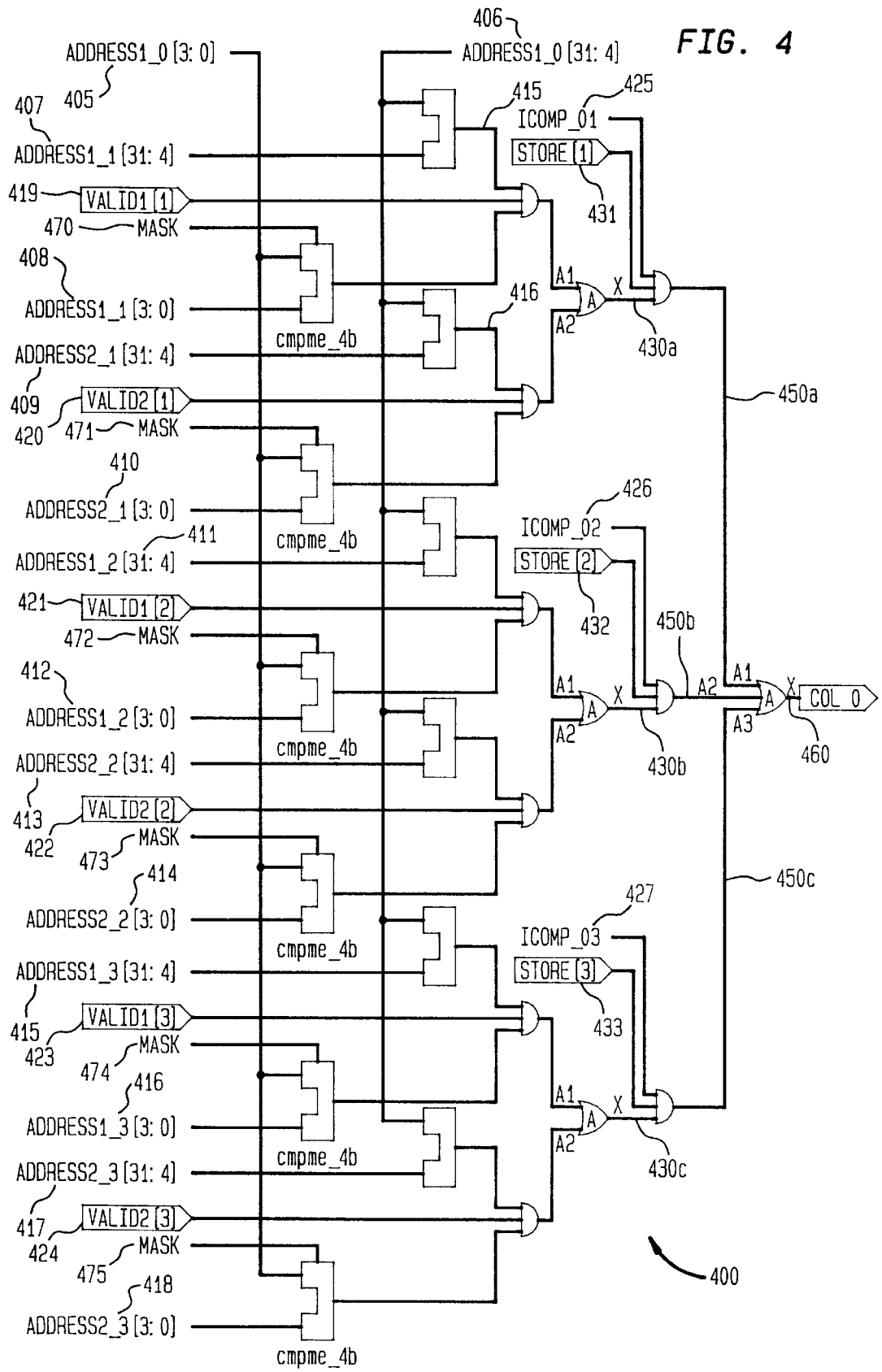
FIG. 4 illustrates a schematic diagram of the address collision block located in LSU 205.

FIG. 4 shows a schematic diagram of an address collision detection block 400 used by LSU 205. The address comparison logic compares two addresses after 0–4 of the least significant bits have been masked out. After masking, if the addresses match exactly then there is a collision between them. For each comparison, the largest operand size of the two operations is used to control the masking. Between 0 and 4 least significant bits are masked out of each address. Note that circuit 400 is duplicated four times—once for each address buffer 410–413 (FIG. 4 shows the address collision detection block for address buffer 310).

The first address 405, 406 for each load is compared against each other pair of addresses 407–418. The two compare results are ANDed with their valid bits 419–424, and then ORed together to produce an address match 430*a*, 430*b*, 430*c*. Address match 430 is then ANDed with the instruction number compare 425–427 and the store bit 431–433 to produce the collision check 450*a*, 450*b*, 450*c*. The instruction number compare 425–427 indicates the relative age between two instructions. For example, instruction compare 425 indicates the relative age between a first instruction in address buffer 310 and a second instruction in address buffer 311. If the second instruction is older then the first instruction then no collision exists. These three collision checks 450 are ORed together to yield an address collision signal 460 for the particular load being checked.

When detecting an address collision, the starting (first) address of each load is compared with the first and second address of each store. Since a load or store operation may be accessing anywhere from 1 to 10 bytes, some masking of the address is done to insure that a collision will be detected. This is done via signals 470–475. 0, 2, 3 or 4 of the least-significant-bits are masked out of both addresses before comparing them to each other. If the masked addresses match exactly (equal compare) then an address collision is possible. The number of bits to mask out (0, 2, 3, 4) depends on the operand size of the two instructions whose addresses are being compared, along with the two least significant bits of the first address. The two least significant bits of the first address must be used in order to limit the number of collisions which are detected incorrectly. The largest operand size is used with masking as follows:

| Operand Size | Number of Bits to Mask |
|---|---|
| 1 byte | 0 bit mask |
| 2 bytes | 1 bit mask if address ends in 0 |
| | 2 bit mask if address ends in 01 |
| | 3 bit mask if address ends in 11 |
| 4 bytes | 2 bit mask if address ends in 00 |
| | 3 bit mask if address ends in 1 or |
| 8 bytes | 3 bit mask |
| 10 byte | 4 bit mask |

Additionally, any time the load operation crosses a quad-word boundary, it is assumed to have an address collision. This is because only the first address of the load is compared to the store addresses and an address collision might not be detected.

By doubling the number of comparators used in hardware, this restriction could be removed. If the store address crosses a quad-word boundary then the collision would be detected.

The following examples show why masking is required. (All numbers below are in binary). Address2 of the load is not given since it is not used for collision checking.

EXAMPLE 1

| Operation | address1 | address2 | size | mask |
|---|---|---|---|---|
| LOAD | .....1001 | — | 2 bytes | 2 bits |
| STORE | .....1000 | .....1011 | 4 bytes | 2 bits |

If load address 1001 was compared with 1000 and 1011 without masking, no collision would be detected even though the store will actually write to bytes 1000, 1001, 1010 and 1011. If the two LSB's are masked out then the following addresses will result:

| Operation | address1 | address2 |
|---|---|---|
| LOAD | .....1000 | — |
| STORE | .....1000 | .....1000 |

EXAMPLE 2

| Operation | address1 | address2 | size | mask |
|---|---|---|---|---|
| LOAD | .....0100 | — | 4 bytes | 2 bits |
| STORE | .....0001 | .....1000 | 8 bytes | 3 bits |

If three LSB's are masked out then the following addresses will result and the address collision will be detected:

| Operation | address1 | address2 |
|---|---|---|
| LOAD | .....0000 | — |
| STORE | .....0000 | .....1000 |

If only two LSB's are masked out then the following addresses will result and the address collision will not be detected:

| Operation | address1 | address2 |
|---|---|---|
| LOAD | .....0100 | — |
| STORE | .....0000 | .....1000 |

As discussed above, LSU 205 can select from a window of up to four load instructions and four store instructions requiring a cache request. These loads and stores contend with each other for CCU 110 and the selection between them is done as outlined below.

The store instruction must be performed in program order with respect to all other instructions, not just other load and stores. A store request is issued to CCU 110 when a signal comes from IEU 107 to retire the store instruction. This signal indicates that all previous instructions have finished and they did not involve an exception or mispredicted branch. The store instruction cannot be performed any earlier since a store irrevocably changes the state of the machine and it is essential to verify that an exception or branch did not occur. The store is given priority over a load for using data cache 119 since delaying the store would also delay the retirement of the bucket and the acceptance of the next decoded bucket from the instruction decode unit (not shown).

Most load instructions can be issued out-of-order provided that the load is not dependent on a previous store. An exception to this is loads with side effects such as reads from memory-mapped I/O. The preferred embodiment of the present invention uses a memory-mapped input/output (I/O) subsystem. Some I/O devices change state when accessed by a read; for example, some FIFO buffers sequence to the next data item which results in some device-status registers clearing themselves. In this type of system, load bypassing is a dangerous operation. A bypassed load may be issued incorrectly, because of a mispredicted branch or exception. The bypassed load cannot be allowed to modify the system state incorrectly. The problem is solved by configuring the load store unit to make these type of requests in order.

The load/store unit also provides a mechanism for notifying cache 110 whether or not the data involved in the cache request is cacheable or not. It also allows the processor to notify cache 110 that this data should be write-through meaning it is cacheable, but should also write through to the memory immediately. External read accesses that change system states are a subset of these non-cacheable accesses, but the problem above is solved by making in-order requests in conjunction with notifying cache 110 that this data is not cacheable. Thus, rather than avoiding load bypassing altogether, the processor can prevent the bypassing of non-cacheable loads. This permits most load operations to take advantage of bypassing, without causing incorrect operation for the occasional noncacheable load. This is also necessary to insure that no exceptions occur before the memory is changed. If a load does not have a dependency on a store then "load bypassing of stores" will occur.

Each load thus has associated with it two bits: page_cache_disable and page_write_through. These can come either from VMU 115 or IEU 107.

Store data can come from one of two place. First, it can be issued directly to LSU 205 on the integer data buses during 64-bit integer stores. The second way is by snooping the results of the integer and floating point functional units. This is done to support the common "execute-then-store" sequences where the result of an execution is the store data for the instruction. This allows the results of CISC instructions such as "[R2]<[R2] OR R4" to be stored without being explicitly issued to LSU 205.

LSU 205 can only make one request to CCU 110 per cycle and priority is given to store operations. Store operations are sent to CCU 110 as soon as the write control notifies LSU 205 that this instruction is ready for retirement. Next priority is given to the oldest load operation with a valid address in the address buffers 310–313 which does not have an address collision or pending write. Relative age between the instruction is determined by buffer location and the value of the buffer pointer. Finally, priority is given to a new load just arriving from DAFU 230. In this last case, address collision and pending write will not be checked until after the request has been made, and if necessary, the load request will be canceled.

Occasionally, a cache miss will occur. For a store, CCU 110 handles this situation and the miss is completely transparent to LSU 205. For a load, LSU 205 is notified of the cache miss and a delay is observed before the data is returned. LSU 205 then signals the IEU 107 that the cache miss occurred so that instructions waiting for this data can be canceled.

If the desired data crosses a cache line boundary, two or three cache accesses must be made for the load operation. These requests are made consecutively, one each cycle. In a preferred embodiment, a cache line is 8 bytes wide and aligned at address ending with 000. Three cache requests are only required for 80-bit data accesses beginning at an address ending in 111. A load aligner 550 (described below with reference to FIG. 5) is provided to shift and latch this data as it returns from data cache 119.

Most load/store units zero-extend or sign-extend the data to fit the destination register. However, the preferred embodiment of the present invention preserves the initial value of the destination register and only changes a portion of it. This, of course, is relevant only for integer load data with a size of 8 or 16 bits. The initial contents of the register are sent to LSU 205 at the time of address calculation. The load data from data cache 119 is then merged with the initial data.

Figure 5:
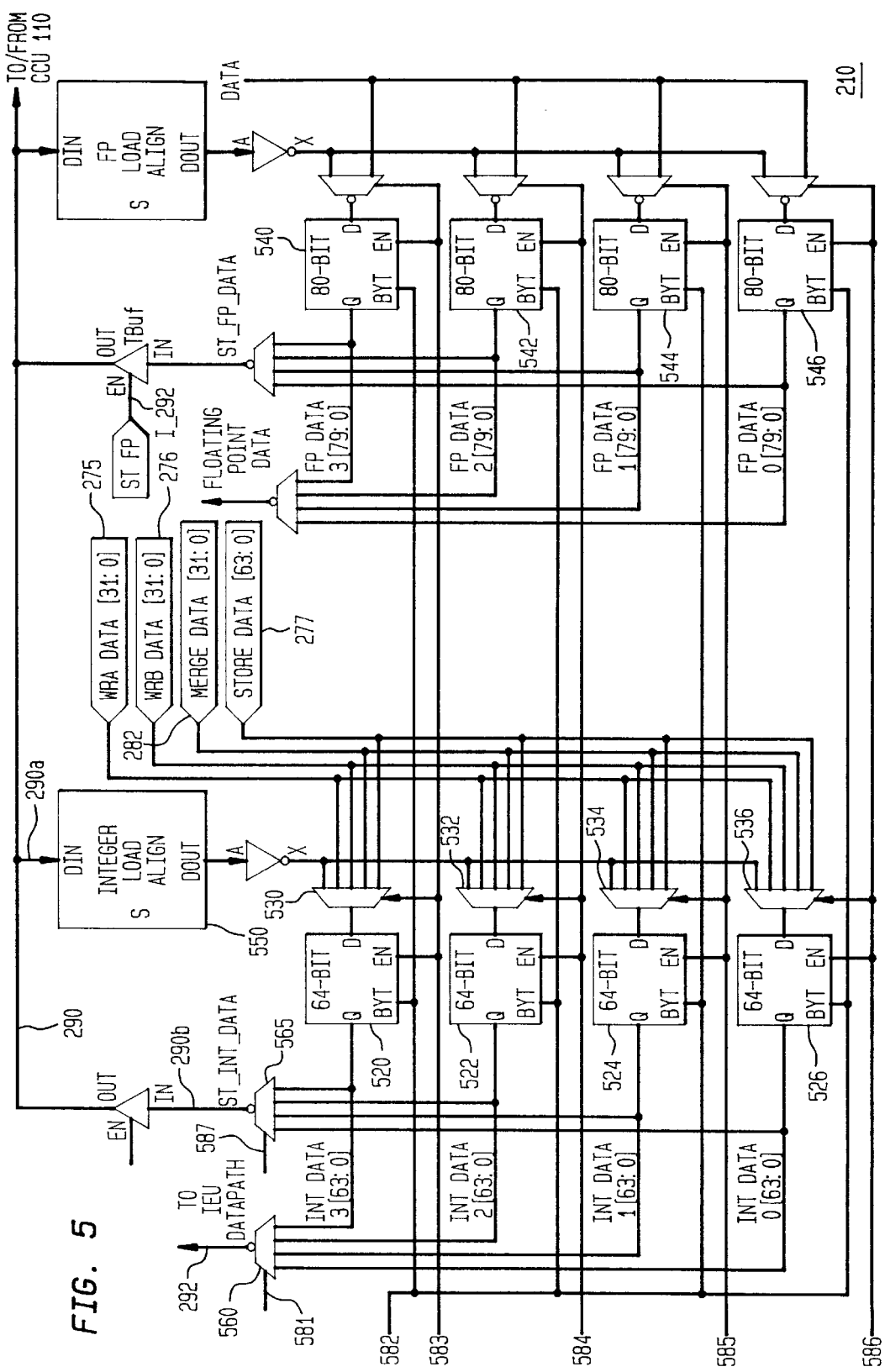
FIG. 5 illustrates a schematic diagram of LSU data path 210.

FIG. 5 shows a schematic diagram of LSU integer data path 210. LSU data path 210 is responsible for transferring load and/or store data to and from CCU 110 and IEU 107. Data enters LSU data path 210 during a load operation from data cache 119 via line 290 and during a store operation from IEU 107 via lines 275, 276, 277. Data line 275 and 276 provide 32 bit data to LSU data path 210 from functional units 260 and 262 via write bus 270, line 282 provides either an effective address or merge data. The effective address is provided to LSU data path 210 when the result of an instruction is an address itself, as opposed to the data located at that address location. Store data line 516 provides 64 bit data to LSU data path 210. Data is returned to either data cache 119 or IEU 107 via data lines 290 or 292, respectively.

Data buffers 520–526 are provided for holding load and/or store data during data transfer to or from data cache 119. There is a one-to-one correspondence between each data buffer 520–526 and address buffers 310–313 (and in turn with the four instruction buckets). For each address buffer 310–313, there are two corresponding data buffers in LSU data path 210: one for integer load and integer store data (8 bytes) 520–526 and one for floating point load and store data (10 bytes) 540–546. The present invention has a separate LSU data path for floating point operations. The operation of floating point data buffers 540–546 is the same as those described in connection with the integer data path. Since an instruction is either integer or floating point, the two units are do not need to be physically connected. Only the operation of integer data buffers 520–526 will be described in detail below.

Control lines 581 and 587 are provided to control the data flow through multiplexers 560 and 565, respectively. Control lines 582 through 586 are provided to control data flow to/from data buffers 520, 522, 524, and 526.

During a load operation, data enters LSU data path 210 from data cache 119 via line 290. The load data enters align block 550 which aligns the data (as described below) and transfers the aligned load data to multiplexers 530–536. The aligned load data is then latched into one of the data buffer 520–526 depending on which instruction requested the data. During a store operation, the store data enters LSU data path 210 from IEU 107 via data lines 275, 276, 277 and is subsequently latched into the appropriated data buffer 520–526.

Once either the load and/or store data has been latched into data buffers 520–526, it can be forwarded to either data cache 119 via line 290 or IEU via line 292. All four data buffers 520–526 provide data to multiplexers 560, 565 which in turn select the appropriate data to be transferred out of LSU data path 210.

Oftentimes, the results of an instruction which includes a store must be stored into main memory 260. Thus, after the instruction executes the result is directly written via data lines 275, 276 to LSU data path 210 (as opposed to first storing the results in register file 250). LSU data path 210 holds the data in the appropriate data buffer 520–526 until it receives a retirement signal for the instruction.

Periodically, a particular instruction does not intend to store over an entire destination register. In this case, "merge data" is provided to LSU data path 210 via data line 282. For example, if an instruction only wants to store 8 bits to the destination register, but the instruction intends to preserve the remaining 24 bits in the register, a merge operation is performed. Thus, data line 282 would supply the initial value (i.e., merge data) of the destination register to LSU data path 210. The merge data (i.e., contents of the destination register) is latched into the appropriate data buffer 520–526. Next, the new (load) data returns from the cache via line 290(*a*) and enters align block 550. Align block 550 aligns the data and provides it to the multiplexers 530–536. The load data is then latched into the same data buffer 520–526 which is holding the merge data. Once all the data is assembled it can be transferred to the proper memory location (i.e., data cache 119 or register file 250).

Conventional load store units typically require addresses to be aligned to certain boundaries. For example, a 32-bit data access must have an address ending in 000. However, the computer architecture of a preferred embodiment allows unaligned accesses of 8, 16, 32, 64, or 80 bit data. Having unaligned addresses has the following effects: (1) extra hardware is required for detecting load dependencies on stores; (2) the data may cross a page boundary requiring two address translations; and (3) multiple cache accesses may be required for one load.

The load data returned from CCU 110 is 8 bytes long and must be aligned and placed in the proper position in the data buffer 520–526. Sometimes two or three sets of data must be returned before the complete load is ready (e.g., when more than one cache access is required). In addition, these sets of data may even be returned out of order, so special handling is required.

Integer data alignment is handled by using eight 8-input multiplexers (8 bits wide) with each corresponding to one byte of the data request. An 8 bit select line is used to determine which of the 8 bytes of data loaded from CCU 110 should be latched into the appropriate data buffer 520–526. Additionally, data buffer 520-236 are byte enabled to control which bytes can be overwritten.

Figure 6:
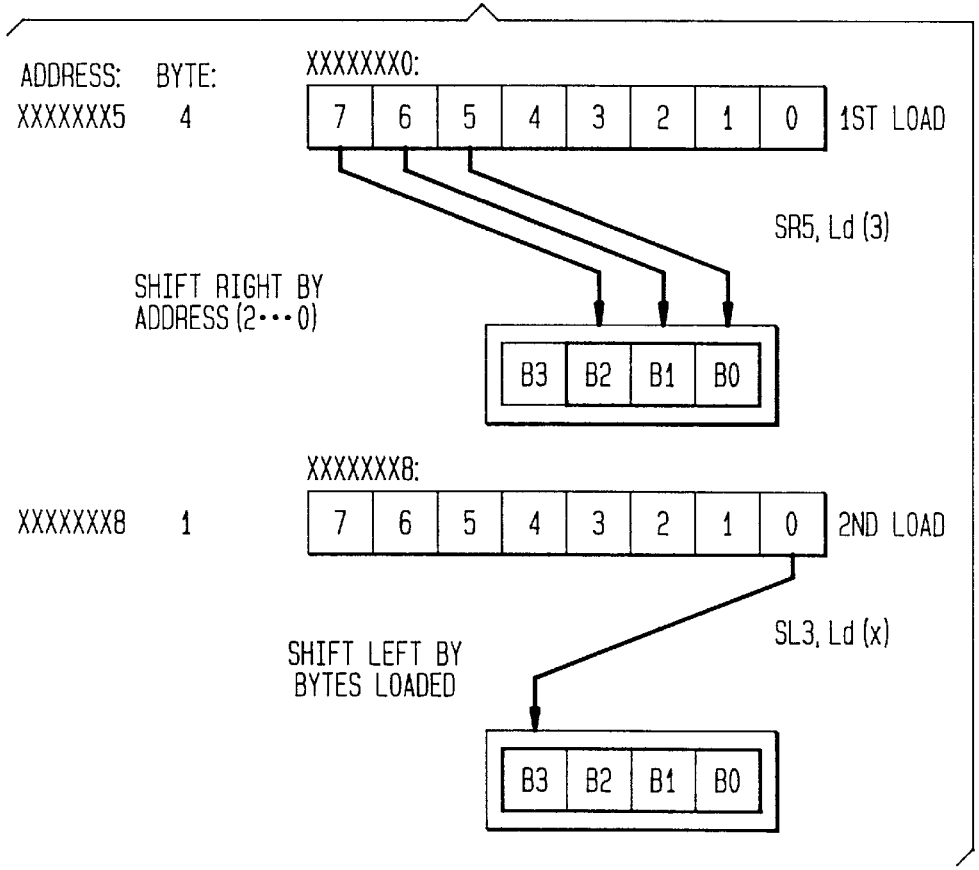
FIG. 6 shows an example of an unaligned integer load with a cache line crossing.

FIG. 6 depicts an example of an unaligned integer load with a cache line crossing. In the example, a four byte load was requested from address XXXXXXX5. However, this load request crosses over a cache line, and consequently, two load requests are required. After the first cache request returns the data, the data is transferred to load aligner 550. Load aligned 550 shifts the last three bytes all the way over to byte zero and then the last three bytes are latched into the appropriate data buffer 520–526. Note that the last byte of the data buffer is not stored over. Once the data from the second cache request returns, the first byte of the cache line is latched into the last byte of the data buffer, as shown. Also note that although the cache line returned in order in this example, it can be returned in either order.

Floating point data alignment works the same way as integer data alignment except that ten 8-input multiplexers are used.

LSU 205 does not support load forwarding. If a load is dependent on a store then that load must wait for the store data to be written to the cache before making the load request. However, there is nothing inherent about the design of the present invention that would discourages implementing a load forwarding mechanism. Those skilled in the art would readily be in a position to make the necessary hardware changes to implement load forwarding.

The preferred embodiment of LSU 205 supports a multi-processing environment. Each instruction can contain a lock or an unlock command in addition to a load and/or a store. These signals are sent to the cache which will lock the data and notify the memory and I/O subsystems to do the same. When lock or unlock commands are present in the instruction window, loads must be performed in order with respect to these instructions; i.e., a subsequent load can not be performed without first performing the load with the lock/unlock command.

Example of the Operation of LSU 205

Shown in TABLE A is a sample program that illustrates the operation of LSU 205. The program is written in Intel 486 notation. Three registers are used and they are labeled eax, ebx, and ecx. The data that is loaded and/or stored is assumed to be 32 bits in width. Brackets indicate an address location.

TABLE A (1) mov ebx, [ecx]
(2) dec ebx
(3) or [eax], ebx
(4) (size__16) mov ebx, [eax +3]

The first line of code moves data stored at the address in ecx to ebx; thus this instruction involves a load operation. The second instruction decreases the value in register ebx; there is neither a load nor a store associated with this instruction. The third instruction does a logical OR with the data stored at the address in eax with the data ebx and stores it in [eax]; this operation involves a load and a store. Finally, the fourth instruction moves 16 bits of data stored at the address in eax plus three to ebx; this instruction involves a load operation.

Before this code is executed, assume that the registers and memory contain the following values (all value are in hex):

TABLE B

| eax = 0000__0100 | [0100] = 0000__4321 |
| | [0104] = FFFF__FFFF |
| ecx = 0000__1201 | [1200] = 6500__01FF |
| | [1204] = FFFF__FF87 |

Table C shows the results of executing the instructions shown in Table A.

TABLE C

| mov ebx, [ecx] | EBX <-- [ 1201 ] 8765__0001 |
| dec ebx | EBX <-- 8765__0001 − 1 = 8765__0000 |
| or [eax], ebx | [EAX] <-- 0000__4321 or 8765__0000 = 8765__4321 |
| (SIZE__16) mov ebx, [eax + 3] | EBX <-- [ 0100 + 3 ] = [ 0103 ] FF87 -> 8765__FF87 |

Next, the execution of the instructions in TABLE A will be described in detail.

Referring to FIG. 7(*a*) through 7(*h*), a representative illustration of LSU 205 is shown. Each figure represents a single cycle (e.g., FIG. 7(a) represents cycle 1 and FIG. 7(b) represents cycle 2). All four address buffers 310–313 are shown, along with their respective load 701, store 702, and valid bits 717. Furthermore, there is a collision bit 710, a pending bit 715, as well as an indication of the size 705 of the data requested. The current memory contents of addresses 0100 to 0107 and 1200 to 1207 is shown at reference number 780. Block 730 indicates the current cache request. Block 740 shows the data that has just been returned (if any) from CCU 110. Block 760 indicates the address being returned from VMU 115 and block 770 indicates the address being returned from DAFU 230. The load and store bits are set in order, while the addresses can be provided to LSU 205 out-of-order. Block 750 shows how returned data is physically aligned.

Referring to FIG. 7(a), the first instruction is "mov ebx, [ecx]". Initially, the address stored in ecx must to transferred to LSU address path 220. The address stored in ecx, namely 1201, is transferred from DAFU 230 to temporary address buffers 305. However, the entire address in not needed. Only the first twelve bits and the least significant three bits are transferred to temporary buffers 305 because the upper 20 bits are transferred to VMU 115 from DAFU 230. The load bit in bucket 0 is set to one since the mov operation involves a load. The requested data is 32 bits (as indicated by 011 in block 705).

Since this is the first set of addresses in LSU 205, the address information is immediately forwarded to CCU 110 along with an identification (id), as shown in block 730. LSU 205 uses the identification to determine which instruction the returned data is associated with. The temporary registers 305 are used while LSU 205 waits for an address being translated by VMU 115 to be transferred to LSU 205.

The second instruction "dec ebx" has been placed into the address buffer queue. Since the dec operation involves neither a load nor a store, load bit 701 and store bit 702 associated with address buffer 311 are both set to zero. An address calculation is not required for this instruction since neither a load nor a store is required.

Turning now to FIG. 7(b), the first byte of the address stored in ecx has now been placed in register address1 and the last byte of the address has been placed in address2. Both, of course, in address buffer 310. Both valid bits have been set since both registers (address1 and address2) contain valid addresses. Note that it is possible for address1 and address2 to be latched into the address buffers 310–313 at different times. This happens when there is a page crossing which requires two translations from VMU 115.

The third instruction is "or [eax], ebx." Information (sent by IEU 107) regarding the third instruction has been entered into the appropriate blocks corresponding to address buffer 312.

Since the OR instruction requires a load and a store operation, both bits have been appropriately set to one. The data requested is 32 bits long, as indicated in block 705. Moreover, the address for the load/store associated with the third instruction is provided by DAFU 230, as shown in block 770. A cache request is made for this data, as shown in block 730.

In addition, during cycle two the data requested for the first instruction has been retrieved from the cache and stored in the data register 520. However, the returned data shown in block 730 is unaligned data. CCU 120 returned the block of data beginning at address 1200,but the instruction requested 32 bits of data starting at 1201. Consequently, the returned data must be aligned as shown in block 750. The returned data is shifted over by two bits by setting LD_ALIGN to 00000010, and then the first 32 bits of data are selected by BYTE_SEL.

Referring now to FIG. 7(c), the LSU 205 is provided with the next address by DAFU 230, as shown in block 770. The addresses associated with the third instruction are latched into address buffer 312. Both valid bits 717 are set. Since the first instruction has completed its operation (i.e., the data was returned from CCU 110 and forwarded to IEU 107) the valid bits have now been reset. (The bucket number has been reset to 4 only for illustration purposes. In a preferred embodiment, a pointer keeps track of the relative age of the instructions.) The third instruction, requires the fetching of the address stored in eax. Once the address enters LSU 205 a cache request can be performed.

In addition, information concerning the fourth instruction, namely the instruction is a load and the data being requested is 16 bits in width (indicated by a 010), has arrived from IEU 107, as shown in the appropriate blocks associated with address buffer 313. However, a store (namely, the third instruction) which is older than the fourth instruction exists. LSU 205 utilizes a pointer to determine which address buffer contains the oldest instruction information. Since this store exists, the write pending bit 715 associated with address buffer 313 is set. Consequently, a cache request cannot be generated for the fourth instruction at this time.

CCU 110 returns data to LSU 205 for instruction three, as indicated in block 740. Since the requested data started at address 100 the returned data does not need to be aligned. Only the first 32 bits are selected by BYTE_SEL, and the data is latched into data buffer 526.

Referring to FIG. 7(d), the addresses associated with instruction four are latched into address buffer 313 and the corresponding valid bits have been set. Next, an address collision operation is performed. Address1 from instruction four is compared with address1 and address2 of instruction three, which results in a determination that an address collision exists. As such, the collision bit 710 associated with address buffer 313 is set. Because of the presence of a collision, a cache request cannot be generated during cycle 4. However, even though a cache request cannot be performed, merge data arrives from IEU 107 for instruction four, as shown in block. The merge data is the data from register ebx. Merge data is required since instruction four is only a 16 bit operation. The merge data is latched into data buffer 526.

Referring to FIG. 7(e), write A data (WRA_DATA) arrives from IEU 107. WRA_DATA represents the results of the OR operation from instruction three. This data is latched into data buffer 524. Also during cycle 5, the next bucket is retired, namely bucket 1, as shown in block 780. Specifically, the retire_next bit is set to one indicating that the next instruction can be retired and the retire_num bit is equal to one indicating that the instruction in bucket one should be retired. Note that the address collision still exists between instruction three and instruction four.

Figure 7F:
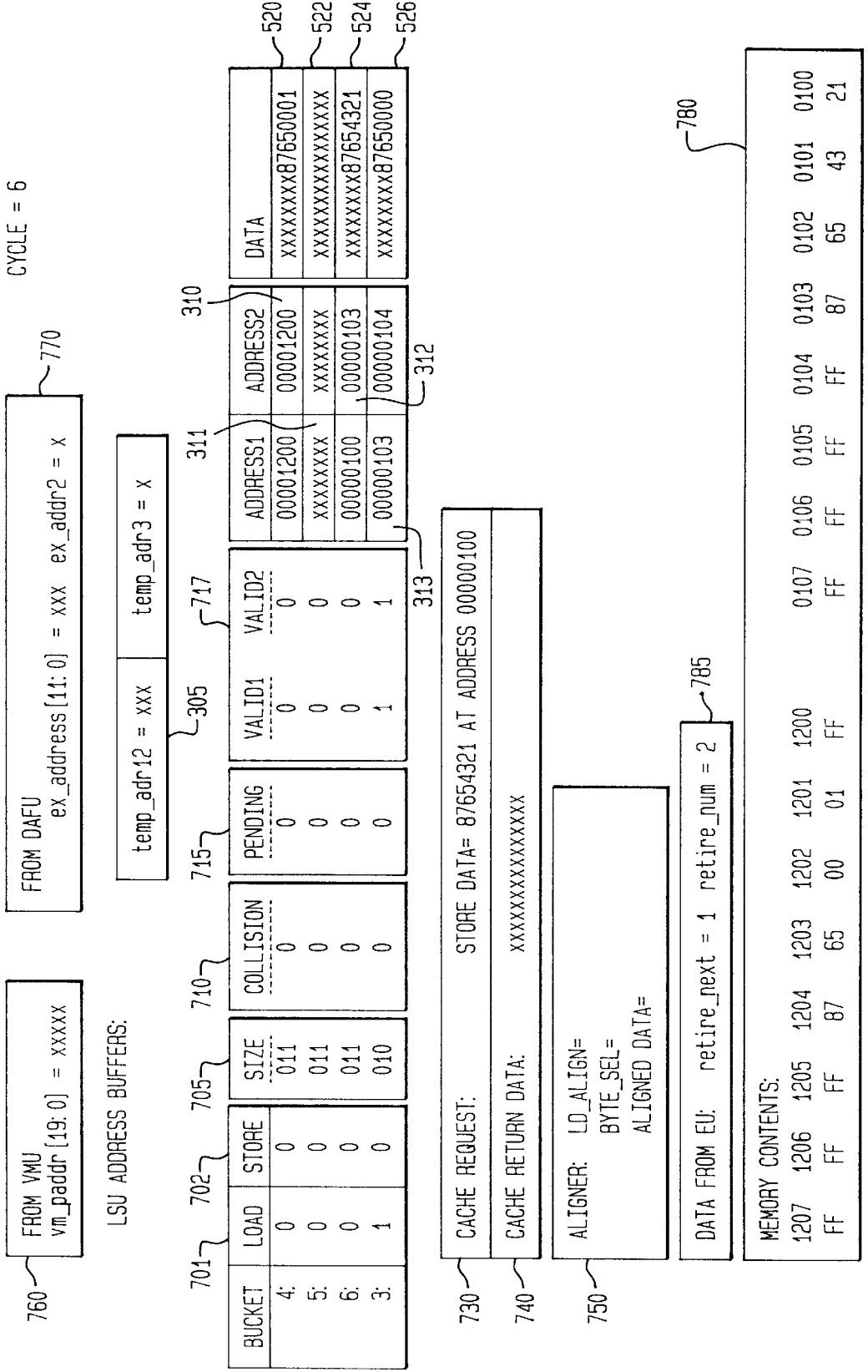

Referring to FIG. 7(f), the data in data buffer 524 has been ORed with the data in ebx to produce the value 87654321. During cycle 6, the third instruction is retired, as shown in block 785. The retirement of instruction three allows LSU 205 to reset the collision bit 710 associated with the fourth instruction. As shown in block 730, a cache request is made to store the value produced by the OR operation at memory location 00000100 (which is the address stored in register eax). As shown in block 780, the data has been stored to this data location.

Figure 7G:
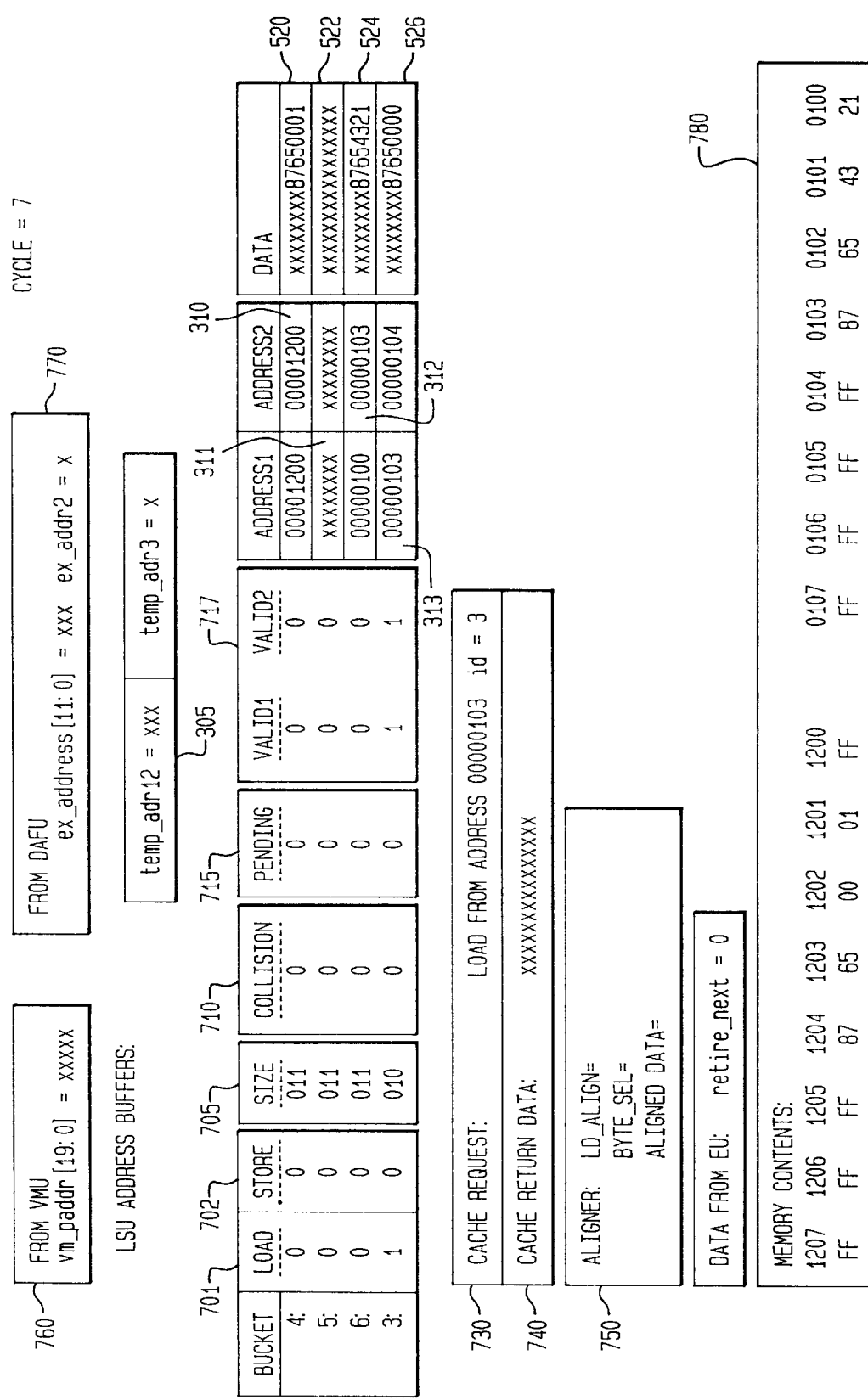

Referring to FIG. 7(g), instruction four loads the data in memory location 0103 (i.e., the first 16 bits of register eax plus three). Consequently, a cache request is made for the load operation associated with instruction four, as shown in block 730.

Figure 7H:
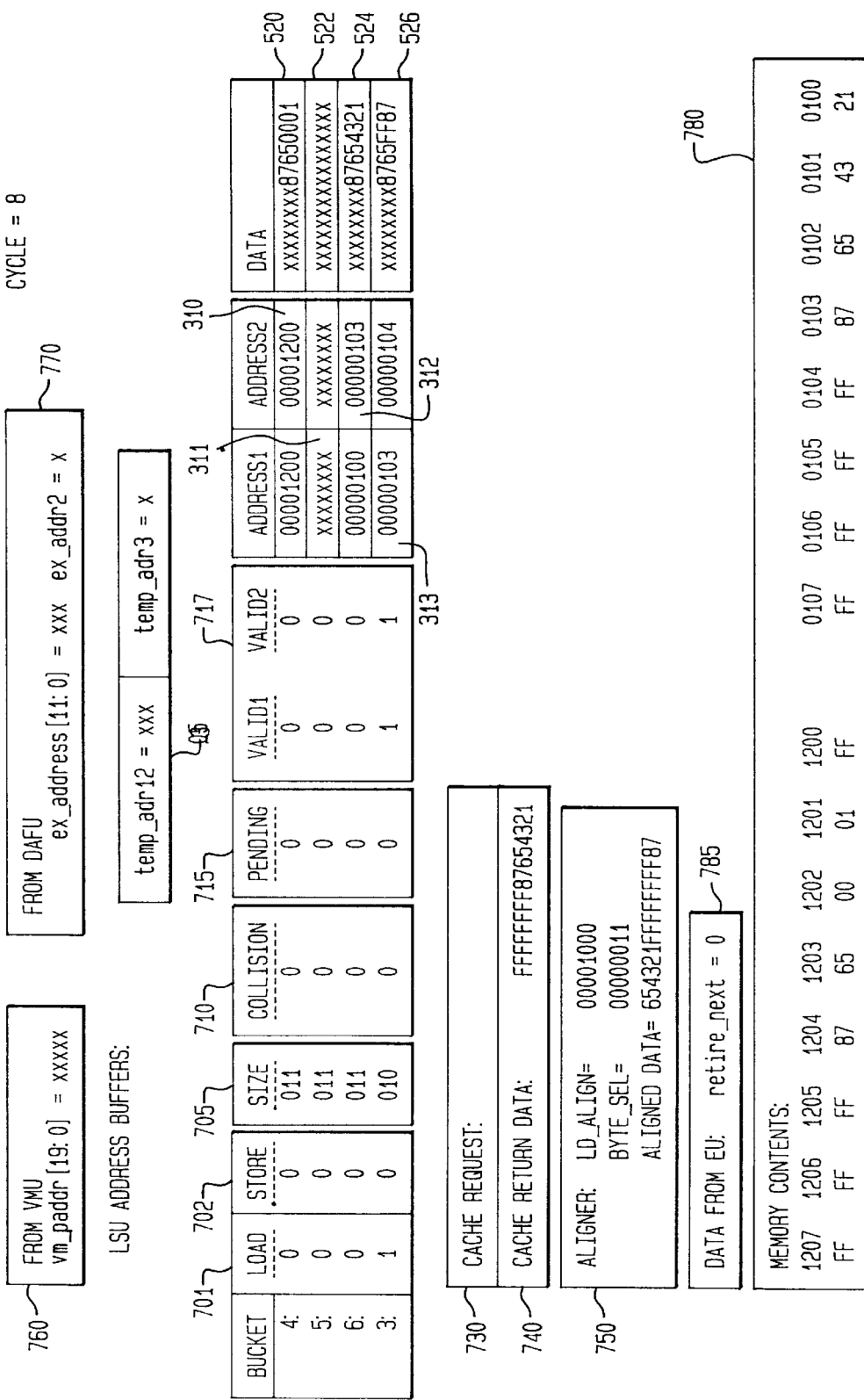

Referring to FIG. 7(h), the requested (unaligned) load data returns from the cache, as shown in block 740. As shown in block 750, the data is then aligned by shifting the data over three bytes since the requested data started at address 0103 and not 0100. Since, only the first 16 bits are requested only the first two bytes are selected from the aligned data. The 16 bits are then latched into data buffer 526, which in turn gets transferred back to IEU 107 for storage in register ebx.

While the invention has been particularly shown and described with reference to preferred embodiments thereof, it will be understood by those skilled in the art that various changes in form and details may be made therein without departing from the spirit and scope of the invention.

What is claimed is:

1. A computer system, comprising:
   (a) a memory system having stored therein non-native instructions and data;
   (b) a processor that executes native instructions, including,
      (1) an instruction fetch unit that fetches said non-native instructions from said memory system;
      (2) an instruction decode unit, responsive to said instruction fetch unit, including,
         (A) an instruction translator to convert said non-native instructions into native instructions, wherein non-native instructions are converted into less than a predetermined number of native instructions;
         (B) a latch to store at least two groups of said native instructions in at least two intermediate buckets, wherein each of said at least two intermediate buckets can store up to said predetermined number of native instructions; and
         (C) a selector to combine a subset of said at least two groups of said native instructions into a final bucket, so as to allow issuing of said subset of said native instructions of said final bucket to an instruction window, wherein said final bucket has a maximum capacity of said predetermined number of native instructions; and
      (2) an execution unit, responsive to said instruction decode unit, for executing said native instructions from said instruction window in an out-of-order fashion, said execution unit including a load store unit adapted to make load requests to said memory system out-of order with respect to all of said native instructions in said instruction window and store requests in-order with respect to all of said native instructions in said instruction window.

2. The computer system of claim 1, wherein said load store unit comprises:
   (A) an address path adapted to manage a plurality of addresses associated with said native instructions being executed and to provide addresses to said memory system;
   (B) address collision means for detecting and signaling whether address collisions and write pendings exist between each of said native instructions being executed, wherein said load store unit performs said load requests if no address collisions and no write pendings are detected; and
   (C) a data path for transferring load and/or store data to and from said memory system and said execution unit, said data path configured to align data returned from said memory system to thereby permit data falling on a word boundary to be returned from said memory system to said execution unit in correct alignment.

3. The computer system of claim 2, wherein said address path includes a first register for storing a first byte associated with a memory access and a second register for storing a last byte associated with said memory access.

4. The computer system of claim 1, wherein said memory system includes a first level memory connected to said processor, a second level memory, and a memory control unit connected between said first level memory and said second level memory, wherein said first level memory holds the most recently accessed instructions and data.

5. The computer system of claim 4, further comprising a second processor connected to said second level memory, wherein said second processor is configured to execute instructions out-of-order.

6. The computer system of claim 4, wherein said first level memory includes an instruction portion and a data portion.

7. The computer system of claim 4, further comprising an input/output subsystem, responsive to said memory control unit.

8. The computer system of claim 1, further comprising a issuer for determining when an instruction can be issued to said instruction window.

9. The computer system of claim 1, wherein said execution unit further comprises:
   a register file;
   a plurality of functional units;
   a first bus, connected to the inputs of said plurality of functional units and further connected to said register file; and
   a second bus connected to the outputs of said plurality of functional units and further connected to said register file.

10. The computer system of claim 9, wherein said second bus transfers data to said first bus.

11. The computer system of claim 9, wherein said second bus transfers data to said data path of said load store unit.

12. The computer system of claim 9, wherein said register file includes a set of real registers and a set of temporary registers, wherein one of said native instructions is retired when data resulting from execution of said one of said native instructions is moved from said temporary registers to said real registers.

13. The computer system of claim 9, wherein data from a load and/or store instruction is stored in said register file from said second bus before data from other instructions.

14. The system according to claim 1, wherein said at least two intermediate buckets can store up to four native instructions at a time.

15. The computer system of claim 1, wherein said predetermined number of native instructions is four native instructions.

16. The computer system of claim 1, wherein the stream of non-native instructions comprises at least two non-native instructions.

17. The computer system of claim 1, wherein said final bucket includes a load, a store and two execute portions.

18. A microprocessor system for executing a program stream, said microprocessor system comprising:
   (a) an instruction fetch unit for fetching instructions from a memory system and for providing a predetermined plurality of said instructions to an instruction buffer;

(b) an execution unit for executing said plurality of said instructions from said instruction buffer in an out-of-order fashion, said execution unit including a load store unit adapted to make load requests to a memory system out-of-order with respect to all instructions in said instruction buffer and store requests in-order with respect to all instructions in said instruction store, said load store unit having,
  (i) address collision means for detecting and signaling whether address collisions and write pendings exist between each of said plurality of said instructions, wherein said load store unit performs said load requests if no address collisions and no write pendings are detected,
  (ii) an address path, responsive to said address collision means, adapted to manage a plurality of addresses associated with said plurality of said instructions and to provide addresses to said memory system, and
  (iii) a data path for transferring load and/or store data to and from said memory system and said execution unit, said data path configured to align data returned from said memory system to thereby permit data falling on a word boundary to be returned from said memory system to said execution unit in correct alignment.

19. The system of claim 18, wherein said address path includes a plurality of address buffers for storing a high order and a low order byte of said load and/or said store request.

20. The system of claim 18, wherein said load store unit further includes means for making multiple memory requests to memory if said data falls on a word boundary.

21. The system of claim 18, further comprising a data address functional unit adapted to calculating addresses for said plurality of instructions and for providing said calculated addresses to said load store unit.

22. The system of claim 21, a virtual memory unit adapted to provide physical address translations, which are generated from a virtual address, to said execution unit and said load store unit.

23. The system of claim 22, wherein said load store unit must have a physical address from said data address function unit and said virtual memory unit before it can make a memory request.

24. The system of claim 18, wherein said instructions are CISC instructions, and wherein said instruction execution unit further comprises decode means for decoding said CISC instructions into RISC instructions.

25. The system of claim 18, wherein said load store unit further comprises means for merging data received from memory with original contents of a destination register.

26. The system of claim 18, further comprising means for directly transferring load and/or execute data from said execution unit to said data path thereby allowing a subsequent store operation to be performed promptly thereafter.

27. The system of claim 18, further comprising an historical pointer for indicating relative age of an instruction in said instruction buffer.

28. The system of claim 18, wherein said collision means indicates a load dependency by determining if there is an address collisions or a pending store address.

29. The system of claim 18, further comprising means for preventing load bypassing of load instructions that will modify the state of the microprocessor system incorrectly.

30. The system of claim 18, wherein said execution unit has a plurality of functional units, wherein the microprocessor system further comprising means for snooping the results of said plurality of functional units in order to provide store data directly to said load/store data path.

31. The system of claim 18, wherein said load store unit has a separate load/store data path for floating point operations.

32. The system of claim 18, wherein said execution unit includes a register file which contains a plurality of real registers and a plurality of temporary registers.

33. The system of claim 18, wherein said instruction buffer comprise a plurality of buckets, each of said buckets contains either a load and a store to the same address, a load only, a store only, or no load and no store.

34. The system of claim 18, wherein said load store unit gives said store requests priority over said load requests.

35. The system of claim 18, further comprising means for preventing load bypassing of noncacheable loads.

36. A computer system, comprising:
  (a) a memory system that is configured to store instructions and data;
  (b) a processor for executing said instructions, said processor having,
    (1) an instruction fetch unit that fetches said instructions from said memory system and for providing a predetermined plurality of said instructions to an instruction window;
    (2) an execution unit for executing said instructions from said instruction window in an out-of-order fashion, said execution unit including a load store unit adapted to make load requests to said memory system out-of order with respect to all of said instructions in said instruction window and store requests in-order with respect to all of said instructions in said instruction window, said load store unit having,
      (A) an address path adapted to manage a plurality of addresses associated with said instructions being executed and to provide addresses to said memory system,
      (B) address collision means for detecting and signaling whether address collisions and write pendings exist between each of said instructions being executed, wherein said load store unit performs said load requests if no address collisions and no write pendings are detected, and
      (C) a data path for transferring load and/or store data to and from said memory system and said execution unit, said data path configured to align data returned from said memory system to thereby permit data falling on a word boundary to be returned from said memory system to said execution unit in correct alignment.

37. The computer system of claim 36, wherein said memory system includes a first level memory, a second level memory, and a memory control unit connected to transfer said instructions and data between said first level memory and said second level memory, wherein said first level memory holds the most recently accessed instructions and data.

38. The computer system of claim 37, further comprising a second processor that is configured to execute instructions from said second level memory out-of-order.

39. The computer system of claim 37, wherein said first level memory includes an instruction portion and a data portion.

40. The computer system of claim 37, further comprising an input/output subsystem that transfers instructions and/or data to said processor and/or memory system via said memory control unit.

41. The computer system of claim 36, further comprising a superscalar control means for determining when an instruction can be issued to said instruction window.

42. The computer system of claim 36, wherein said execution unit further comprises:
   a register file;
   a plurality of functional units;
   a first bus that transfers data from said register file to said plurality of functional units; and
   a second bus that transfers data from said plurality of functional units to said register file.

43. The computer system of claim 42, wherein said second bus transfers data directly to said first bus.

44. The computer system of claim 43, wherein said second bus transfers data directly to said data path of said load store unit.

45. The computer system of claim 36, wherein said register file includes a set of real registers and a set of temporary registers, wherein one of said instructions is retired when data resulting from execution of said one of said instructions is moved from said temporary registers to said real registers.

46. The computer system of claim 36, wherein data from a load and or store instruction is stored in said register file from said second bus before data from other instructions.

47. The computer system of claim 36, further comprising an instruction decode unit that decodes CISC instructions into RISC instructions.

48. The computer system of claim 36, wherein said address path includes a first register for storing a first byte associated with a memory access and a second register for storing a last byte associated with said memory access.

49. A computer system, comprising:
   (a) a memory system that is configured to store instructions and data;
   (b) a processor for executing said instructions, said processor having,
      (1) an instruction fetch unit for fetching said instructions from said memory system and for providing a predetermined plurality of said instructions to an instruction window, wherein said instruction window contains a plurality of buckets, each bucket holding four instructions;
      (2) an execution unit for executing said instructions from said instruction window in an out-of-order fashion, said execution unit including,
         (i) a register file;
         (ii) a plurality of functional units;
         (iii) a first bus that transfers data from said register file to said plurality of functional units;
         (iv) a second bus that transfers data from said plurality of functional units to said register file;
         (v) a load store unit adapted to make load requests to said memory system out-of order with respect to all of said instructions in said instruction window and store requests in-order with respect to all of said instructions in said instruction window, said load store unit having,
            (A) an address path adapted to manage a plurality of addresses associated with said instructions being executed and to provide addresses to said memory system,
            (B) address collision means for detecting and signaling whether address collisions and write pendings exist between each of said instructions being executed, wherein said load store unit performs said load requests if no address collisions and no write pendings are detected,
            (C) a data path for transferring load and/or store data to and from said memory system and said execution unit, said data path configured to align data returned from said memory system to thereby permit data falling on a word boundary to be returned from said memory system to said execution unit in correct alignment.

50. The computer system of claim 49, wherein said memory system includes a first level memory, a second level memory, and a memory control unit connected to transfer said instructions and data between said first level memory and said second level memory, wherein said first level memory holds the most recently accessed instructions and data.

51. The computer system of claim 50, further comprising a second processor that is configured to execute instructions from said second level memory out-of-order.

52. The computer system of claim 50, wherein said first level memory includes an instruction portion and a data portion.

53. The computer system of claim 50, further comprising an input/output subsystem that transfers instructions and/or data to said processor and/or said memory system via said memory control unit.

54. The computer system of claim 50, further comprising a superscalar control means for determining when to issue an instruction to said instruction window.

55. The computer system of claim 49, wherein said second bus transfers data directly to said first bus.

56. The computer system of claim 55, wherein said second bus transfers data directly to said data path of said load store unit.

57. The computer system of claim 49, wherein said register file includes a set of real registers and a set of temporary registers, wherein one of said instructions is retired when data resulting from execution of said one of said instructions is moved from said temporary registers to said real registers.

58. The computer system of claim 49, wherein each of said buckets includes a load, a store and two execute portions.

59. The computer system of claim 49, wherein data from a load and or store instruction is stored in said register file from said second bus before data from other instructions.

60. The computer system of claim 49, further comprising an instruction decode unit that decodes CISC instructions into RISC instructions.

61. The computer system of claim 49, wherein each bucket is associated with a single address that serves as both a load address and a store address.

62. The computer system of claim 49, wherein said address path includes a first register for storing a first byte associated with a memory access and a second register for storing a last byte associated with said memory access.

63. The computer system of claim 49, further comprising a virtual memory unit configured to provide physical address translations, which are generated from a virtual address, to said execution unit and said load store unit.

64. A computer system, comprising:
   (a) a memory system that is configured to store instructions and data;
   (b) a processor for executing said instructions, said processor having,
      (1) an instruction fetch unit for fetching said instructions from said memory system and for providing a predetermined plurality of said instructions to an instruction window, wherein said instruction window contains a plurality of buckets, each bucket holding four instructions;

(2) an execution unit for executing said instructions from said instruction window in an out-of-order fashion, said execution unit including,
(i) a register file;
(ii) a plurality of functional units;
(iii) a first bus that transfers data from said register file to said plurality of functional units;
(iv) a second bus that transfers data from said plurality of functional units to said register file and said first bus; and
(v) a load store unit adapted to make load requests to said memory system out-of order with respect to all of said instructions in said instruction window and store requests in-order with respect to all of said instructions in said instruction window.

65. The computer system of claim 64, wherein said second bus transfers data directly to said load store unit.

66. The computer system of claim 64, wherein said load store unit includes means for checking for address collisions and write pendings between instructions within said instruction window.

67. The computer system of claim 64, wherein said load store unit comprises:

(A) an address path adapted to manage a plurality of addresses associated with said instructions being executed and to provide addresses to said memory system, (B) address collision means for detecting and signaling whether address collisions and write pendings exist between each of said instructions being executed, wherein said load store unit performs said load requests if no address collisions and no write pendings are detected, (C) a data path for transferring load and/or store data to and from said memory system and said execution unit, said data path configured to align data returned from said memory system to thereby permit data falling on a word boundary to be returned from said memory system to said execution unit in correct alignment.

68. The computer system of claim 67, wherein said address path includes a first register for storing a first byte associated with a memory access and a second register for storing a last byte associated with said memory access.

69. The computer system of claim 64, wherein said memory system includes a cache, a main memory, and a memory control unit connected to transfer instructions and data between said cache and said main memory, wherein said cache has a data cache and an instruction cache.

70. The computer system of claim 69, further comprising means for providing priority access to said data cache to store instructions.

71. A computer system, comprising:

(a) a memory system that is configured to store instructions and data;

(b) a processor for executing said instructions, said processor having,
(1) an instruction fetch unit for fetching said instructions from said memory system and for providing a predetermined plurality of said instructions to an instruction window, wherein said instruction window contains a plurality of buckets, each bucket holding four instructions;
(2) an execution unit for executing said instructions from said instruction window in an out-of-order fashion, said execution unit having a load store unit adapted to make load requests to said memory system out-of order with respect to all of said instructions in said instruction window and store requests in-order with respect to all of said instructions in said instruction window, wherein said load store unit comprises:
(i) an address path adapted to manage a plurality of addresses associated with said instructions being executed and to provide addresses to said memory system,
(ii) address collision means for detecting and signaling whether address collisions and write pendings exist between each of said instructions being executed, wherein said load store unit performs said load requests if no address collisions and no write pendings are detected, and
(iii) a data path for transferring load and/or store data to and from said memory system and said execution unit, said data path configured to align data returned from said memory system to thereby permit data falling on a word boundary to be returned from said memory system to said execution unit in correct alignment.

* * * * *

UNITED STATES PATENT AND TRADEMARK OFFICE
CERTIFICATE OF CORRECTION

PATENT NO.   : 5,987,593
DATED        : November 16, 1999
INVENTOR(S)  : Senter et al.

It is certified that error appears in the above-identified patent and that said Letters Patent is hereby corrected as shown below:

Title page,
Item [54], please replace "Senter et al." with -- Brashears et al. --.

Item [75],
Please replace "Cheryl D. Senter, Sunnyvale" with -- Cheryl Senter Brashears, San Jose --.

Column 5,
Line 5, please replace "excuted the" with -- excuted. The --.

Column 9,
Lines 13 and 14, please replace the 2 occurrences of "$\leq$" with -- <-- --.
Lines 20-23, pleae replace the 4 occurrences of "$\geq$" with -- --> --.
Lines 31-32, please replace "CISC to RISC Instruction Translation Alignment and Decoding" with -- System and Method for Extraction, Alignment and Decoding of CISC Instructions into a Nano-Instruction Bucket for Execution by a RISC Computer --.
Line 32, -- now U.S. Patent No. 5,438,668, -- should be inserted after "1992,".

The following references should be added to the list of References Cited in Item [56]:
-U.S. Patent No. 3,346,851
-U.S. Patent No. 3,771,138
-U.S. Patent No. 3,789,365
-U.S. Patent No. 3,916,388
-U.S. Patent No. 4,034,349
-U.S. Patent No. 4,084,235
-U.S. Patent No. 4,189,768
-U.S. Patent No. 4,189,772
-U.S. Patent No. 4,200,927
-U.S. Patent No. 4,228,495
-U.S. Patent No. 4,236,206
-U.S. Patent No. 4,296,470
-U.S. Patent No. 4,315,314
-U.S. Patent No. 4,317,170
-U.S. Patent No. 4,410,939
-U.S. Patent No. 4,434,461
-U.S. Patent No. 4,454,578
-U.S. Patent No. 4,456,955
-U.S. Patent No. 4,459,657
-U.S. Patent No. 4,476,525
-U.S. Patent No. 4,514,803

UNITED STATES PATENT AND TRADEMARK OFFICE
CERTIFICATE OF CORRECTION

PATENT NO. : 5,987,593  
DATED : November 16, 1999  
INVENTOR(S) : Senter et al.

Page 2 of 7

It is certified that error appears in the above-identified patent and that said Letters Patent is hereby corrected as shown below:

-U.S. Patent No. 4,569,016
-U.S. Patent No. 4,587,612
-U.S. Patent No. 4,626,989
-U.S. Patent No. 4,654,781
-U.S. Patent No. 4,675,806
-U.S. Patent No. 4,714,994
-U.S. Patent No. 4,739,471
-U.S. Patent No. 4,752,873
-U.S. Patent No. 4,758,948
-U.S. Patent No. 4,766,566
-U.S. Patent No. 4,771,376
-U.S. Patent No. 4,807,115
-U.S. Patent No. 4,814,976
-U.S. Patent No. 4,858,105
-U.S. Patent No. 4,897,810
-U.S. Patent No. 4,901,228
-U.S. Patent No. 4,903,196
-U.S. Patent No. 4,924,376
-U.S. Patent No. 4,926,323
-U.S. Patent No. 4,942,525
-U.S. Patent No. 4,985,825
-U.S. Patent No. 4,992,931
-U.S. Patent No. 4,992,934
-U.S. Patent No. 4,992,938
-U.S. Patent No. 5,003,462
-U.S. Patent No. 5,101,341
-U.S. Patent No. 5,127,091
-U.S. Patent No. 5,133,072
-U.S. Patent No. 5,148,528
-U.S. Patent No. 5,168,571
-U.S. Patent No. 5,193,206
-U.S. Patent No. 5,226,126
-U.S. Patent No. 5,230,068
-U.S. Patent No. 5,355,460
-U.S. Patent No. 5,390,355
-U.S. Patent No. 5,442,757
-U.S. Patent No. 5,539,911
-U.S. Patent No. 5,606,676
-U.S. Patent No. 5,619,668
-U.S. Patent No. 5,651,125
-U.S. Patent No. 5,689,720

UNITED STATES PATENT AND TRADEMARK OFFICE
CERTIFICATE OF CORRECTION

PATENT NO. : 5,987,593
DATED : November 16, 1999
INVENTOR(S) : Senter et al.

It is certified that error appears in the above-identified patent and that said Letters Patent is hereby corrected as shown below:

-U.S. Patent No. 5,768,575
-EP Publication No. 0 479 390 B1
-EP Publication No. 0 426 393 B1
-EP Publication No. 0 419 105 A2/A3
-EP Publication No. 0 402 856 B1
-EP Publication No. 0 377 991 A2/A3
-EP Publication No. 3 372 751 A2/A3
-EP Publication No. 0 368 332 B1
-EP Publication No. 0 354 585 B1
-EP Publication No. 0 171 595 B1
-EP Publication No. 0 136 179 A2
-FR Publication No. 2 575 564
-GB Publication No. 2 011 682 A
-EP Publication No. 0 170 398 A3
-EP Publication No. 0 272 198 A2
-EP Publication No. 0 380 854 A3
-GB Publication No. 2 230 116 A
-EP Publication No. 0 461 257 A1
-EP Publication No. 0 473 420
-Bakoglu, H.B. et al., "IBM Second-Generation RISC Machine Organization", *1990 IEEE*, pp. 173-178.
-McGeady, S., "The i960CA Superscalar Implementation of the 80960 Architecture", *1990 IEEE*, pp. 232-240.
-Nakano, H. et al., "A 80 Mflops 64-bit Microprocessor for Parallel Computer", *IEEE 1991 Custom Intrgrated Circuits Conference*, pp. 15.2.1-15.2.4.
-Andrews, W., "Distinctions Blur Between DSP Solutions," *Computer Design*, Vol. 28, No. 9, May 1, 1989, Littleton, Mass., pp. 86-99.
-Coldwell, R.P. et al., "A VLIW Architecture for a Trace Scheduling Compiler," *Proceedings of the 2$^{nd}$ International Conference on Atchitectural Support for Programming Languages and Operatin Systems*, Oct. 5-8, 1987, California, pp. 180-192.
-Hennessy et al., Computer Architecture: A Quantitative Approach, Morgan Kaufmann Publishers, Inc., 1990 (in its entirety).
-"Overlap of Store Multiple Operation With Succeeding Operations Through Second Set of General Purpose Registers," *IBM Technical Disclosure Bulletin*, Vol. 28, No. 6, November 1989, New York, NY, pp. 2727-2728.
-Jelemensky, J. et al., "New Microcomputer Features Advanced Hardware For Real-Time Control Applications," *Electro Conference Record*, Vol. 14, April 11, 1989, Los Angeles, CA, pp. 1-9.

UNITED STATES PATENT AND TRADEMARK OFFICE
CERTIFICATE OF CORRECTION

PATENT NO. : 5,987,593
DATED : November 16, 1999
INVENTOR(S) : Senter et al.

It is certified that error appears in the above-identified patent and that said Letters Patent is hereby corrected as shown below:

-Lee, R.B., "Precision Architecture," *COMPUTER*, January 1989, pp. 78-91.
-Melear, C., "The Design of the 88000 RISC Family," *IEEE MICRO*, Vol. 9, No. 2, April 1989, Los Alamitos, CA, pp. 26-38.
-PATENT ABSTRACTS OF JAPAN, Vol. 010, No. 089, April 1986, & JP, A, 60 225 943 (Hitachi Seisakusho K K) 11 November 1985.
-Popescu, V. et al., "The Metaflo Architecture," *IEEE Micro*, June 1991, pp. 10-13 & 63-73.
-Weiss, R., "Third-Generation RISC Processors," *EDN*, March 30, 1992, pp. 96-108.
-Odnert, D. et al., "Architecture and Compiler Enhancements for PA-RISC Workstations,"
*Proceedings from IEEE Compcon*, February 25-March 1, 1991, San Francisco, CA, pp. 214-218.
-8-Bit Embedded Controller Handbook, Intel, 1989, pp. 1-1 - 1-19 and 3-1 - 3-37.
-Sohi et al., "Instruction Issue Logic for High-Performance, Interruptable Pipelined Processors," *14$^{th}$ Annual Int'l Symposium on Computer Architecture*, June 2-5, 1987, pp. 27-34.
-Smith et al., "Implementation of Precise Interrupts in Pipelined Processors,"
*Proceedings of the 12th Annual International Symposium on Computer Architecture*, June 1985, pp. 36-44.
-Wedig, R.G., Detection of Concurrency In Directly Executed Language Instruction Streams, (Dissertation), June 1982, pp. 1-179.
-Agerwala et al., "High Performance Reduced Instructions Set Processors," IBM Research Division, March 31, 1987, pp. 1-61.
-Gross et al., "Optimizing Delayed Branches," *Proceedings of the 5th Annual Workshop on Microprogramming*, October 5-7, 1982, pp. 114-120.
-Tjaden et al., "Representation of Concurrency with Ordering Matrices," *IEEE Trans. On Computers*, Vol. C-22, No. 8, August 1973, pp. 752-761.
-Tjaden, Representation and Detection of Concurrency Using Ordering Matrices, (Dissertation), 1972, pp. 1-99.
-Foster et al., "Percolation of Code to Enhance Parallel Dispatching and Execution," *IEEE Trans. On Computers*, December 1971, pp. 1411-1415.
-Thornton, J.E. Design of a Computer: The Control Data 6600, Control Data Corporation, 1970, pp. 58-140.
-Weiss et al., "Instruction Issue Logic in Pipelined Supercomputers," Reprinted from *IEEE Trans. on Computers*, Vol. C-33, No. 11, November 1984, pp. 1013-1022.
-Tomasulo, R.M., "An Efficient Algorithm for Exploiting Multiple Arithmetic Units," *IBM Journal*, Vol. 11, January 1967, pp. 25-33.
-Tjaden et al., "Detection and Parallel Execution of Independent Instructions," *IEEE Trans. On Computers*, Vol. C-19, No. 10, October 1970, pp. 889-895.

UNITED STATES PATENT AND TRADEMARK OFFICE
CERTIFICATE OF CORRECTION

PATENT NO. : 5,987,593
DATED : November 16, 1999
INVENTOR(S) : Senter et al.

It is certified that error appears in the above-identified patent and that said Letters Patent is hereby corrected as shown below:

-Pleszkun *et al.*, "The Performance Potential of Multiple Functional Unit Processors," *Proceedings of the 15th Annual Sumposium on Computer Architecture,* June 1988, pp. 37-44.
-Pleszkun *et al.*, "WISQ: A Restartable Architecture Using Queues," *Proceedings of the 14th International Symposium on Computer Architecture,* June 1987, pp. 290-299.
-Hwu *et al.*, "Checkpoint Repair for High-Peformance Out-of-Order Execution Machines," *IEEE Trans. On Computers,* Vol. C-36, No. 12, December 1987, pp. 1496-1514.
-Jouppi *et al.*, "Available Instruction-Level Parallelism for Supersclar and Superpipelined Machines," *Proceedings of the 3rd International Conference on Architectural Support for Programming Languages and Operating Systems,* April 1989, pp. 272-282.
-Hwu *et al.*, "Exploiting Parallel Microprocessor Microarchitectures with a Compiler Code Generator," *Proceedings of the 15th Annual Symposium on Computer Architecture,* June 1988, pp. 45-53.
-Colwell *et al.*, "A VLIW Architecture for a Trace Scheduling Compiler," *Proceedings of the 2nd International Conference on Architectural Support for Programming Languages and Operating Systems,* October 1987, pp. 180-192.
-Uht, A.K., " An Efficient Hardware Algorithm to Extract Concurrency From General-Purpose Code," *Proceedings of the 19th Annual Hawaii International Conference on System Sciences,* 1986, pp. 41-50.
-Charlesworth, A.E., "An Approaach to Scientific Array Processing: The Architectural Design of the AP-120B/FPS-164 Family," *Computer,* Vol. 14, September 1981, pp. 18-27.
-Acosta, Ramón D. *et al.*, "An Instruction Issuing Approach to Enhancing Performance in Multiple Functional Unit Processors," *IEEE Transactions On Computers,* Vol. C-35, No. 9, September 1986, pp. 815-828.
-Groves, R.D. and Oehler, R., "An IBM Second Generation RISC Processor Architecture," *IEEE,* 1989, pp. 134-137.
-Smith, M.D. *et al.*, "Boosting Beyond Static Scheduling in a Superscalar Processor," *IEEE,* 1990, pp. 344-354.
-Murakami, K. *et al.*, "SIMP (Single Instruction stream/Multiple instruction Pipelining): A Novel High-Speed Single-Processor Architecture," *ACM,* 1989, pp. 78-85.
-Jouppi, N.P., "The Nonuniform Distribution of Instruction-Level and Machine Parallelism and Its Effect on Performance," *IEEE Transactions on Computers,* Vol. 38, No. 12, December 1989, pp. 1645-1658.
-Horst, R.W. *et al.*, "Multiple Instruction Issue in the NonStop Cyclone Processor," *IEEE,* 1990, pp. 216-226.
-Goodman, J.R. and Hsu, W., "Code Scheduling and Register Allocation in Large Basic Blocks," *ACM,* 1988, pp. 442-452.

UNITED STATES PATENT AND TRADEMARK OFFICE
CERTIFICATE OF CORRECTION

PATENT NO. : 5,987,593
DATED : November 16, 1999
INVENTOR(S) : Senter et al.

It is certified that error appears in the above-identified patent and that said Letters Patent is hereby corrected as shown below:

-Lam, M.S., "Instruction Scheduling For Superscalar Architectures," *Annu. Rev. Comput. Sci.*, Vol. 4, 1990, pp. 173-201.
-Aiken, A. and Nicolau, A., "Perfect Pipelining: A New Loop Parallelization Technique*," pp. 221-235.
-Jouppi, N.H., "Integration and Packaging Plateaus of Processor Performance," *IEEE*, 1989, pp. 229-232.
-Smith et al., "Limits on Multiple Instruction Issue," *Proceedings of the 3rd International Conference on Architectural Support for Programming Languages and Operating Systems*, April 1989, pp. 290-302.
-Patt et al., "Critical Issues Regarding HPS, A High Performance Microarchitecture," *Proceedings of the 18th Annual Workshop on Microprogramming*, December 1985, pp. 109-116.
-Patt et al., "HPS, A New Microarchitecture: Rationale and Introduction," *Proceedings of the 18th Annual Workshop on Microprogramming*, December 1985, pp. 103-108.
-Keller, R.M., "Look-Ahead Processors," *Computing Surveys*, Vol. 7, No. 4, December 1975, pp. 177-195.
-Hwu et al., "HPSm, a High Performance Restricted Data Flow Architecture Having Minimal Functionality," *Proceedings form ISCA-13*, Tokyo, Japan, June 2-5, 1986, pp. 297-306.
-*i*486™ *Microprocessor Programmer's Reference Manual*, Order No. 24086, Intel Corporation, Santa Clara, California, 1990.
-*i*486™ *Microprocessor Hardware Reference Manual*, Order No. 240552, Intel Corporation, Santa Clara, California, 1990.
-Faix, M. and Schuenemann, C., "Combined Macro/Micro Program Machine," *IMB Technical Disclosure Bulletin*, Vol. 14, No. 1, June 1971, p. 298.
-*Patent Abstracts of Japan*, Vol. 009, No. 006 (P-326), January 11, 1985.
-Ohr, S., "Superlong instructions help supermini refine number crunching," *Electronic Design*, Vol. 33, No. 26, November 1985.
-McNeley, K.J. and Milutinovic, V.M., "Emulating a Complex Instruction Set Computer with a Reduced Instruction Set Computer," *IEEE Micro*, Vol. 7, No. 1, pp. 60-71, February 1987.
-Wharton, J. J., "Parallel 486 pipelines produce peak processor performance," *Microprocessor Report*, Vol. 3, No. 6, June 1989, p13(5).
-Garth, S.C.J., "Combining RISC and CISC in PC Systems," *IEEE*, pp. 10/1-10/5.
-Crawford, J., "The Execution Pipeline of the Intel i486 CPU," *IEEE*, 1990, pp. 254-258.
Heath, S.," Architectural considerations for a M88000 superscalar RISC processor," pp. 6/1-6/6.

UNITED STATES PATENT AND TRADEMARK OFFICE
CERTIFICATE OF CORRECTION

PATENT NO. : 5,987,593
DATED : November 16, 1999
INVENTOR(S) : Senter et al.

It is certified that error appears in the above-identified patent and that said Letters Patent is hereby corrected as shown below:

-*Patent Abstracts of Japan*, Vol. 017, No. 082 (P-1489), February 18, 1993.
-*Patent Abstracts of Japan*, Vol. 017, No. 084 (P-1490), February 19, 1993.

Signed and Sealed this

Twentieth Day of November, 2001

*Attest:*

NICHOLAS P. GODICI
*Attesting Officer*  Acting Director of the United States Patent and Trademark Office